(12) United States Patent
Uguen et al.

(10) Patent No.: US 7,496,737 B2
(45) Date of Patent: *Feb. 24, 2009

(54) HIGH PRIORITY GUARD TRANSFER FOR EXECUTION CONTROL OF DEPENDENT GUARDED INSTRUCTIONS

(75) Inventors: Laurent Uguen, Lesneven (FR); Sébastien Ferroussat, Ambérieu en Bugey (FR); Andrew Cofler, La Murette (FR); Thomas Alofs, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 291 days.

This patent is subject to a terminal disclaimer.

(21) Appl. No.: 11/031,956

(22) Filed: Jan. 7, 2005

(65) Prior Publication Data
US 2005/0251661 A1 Nov. 10, 2005

Related U.S. Application Data

(63) Continuation of application No. 10/743,333, filed on Dec. 22, 2003, now abandoned, which is a continuation of application No. 10/384,175, filed on Mar. 7, 2003, now abandoned, which is a continuation of application No. 10/272,492, filed on Oct. 15, 2002, now abandoned, which is a continuation of application No. 10/084,611, filed on Feb. 27, 2002, now abandoned, which is a continuation-in-part of application No. 09/563,703, filed on May 2, 2000, now abandoned.

(30) Foreign Application Priority Data
May 3, 1999 (EP) .................................. 99410055

(51) Int. Cl.
G06F 9/00 (2006.01)

(52) U.S. Cl. ..................................................... 712/225
(58) Field of Classification Search ................. 712/214, 712/215, 216, 218, 219, 225, 226, 233, 221
See application file for complete search history.

(56) References Cited

U.S. PATENT DOCUMENTS
5,301,340 A 4/1994 Cook (Continued)

FOREIGN PATENT DOCUMENTS
EP 0 403 014 A2 12/1990

(Continued)

OTHER PUBLICATIONS

Hennessy and Patterson, "Computer Architecture—A Quantitative Approach, 2nd Edition," 1996, p. 136.*

(Continued)

*Primary Examiner*—David J Huisman
(74) *Attorney, Agent, or Firm*—Lisa K. Jorgenson; James H. Morris; Wolf, Greenfield & Sacks, P.C.

(57) ABSTRACT

A method of transferring guard values and a computer system, such as a processor for digital signal processing, including a parallel set of execution units that utilizes the method. A master set of guard indicators is held in association with one of the execution units. If other execution units require the guard values for particular guard indicators, a sendguard instruction is issued to the execution unit holding the master guard values. The sendguard instructions are held in a separate queue from the main instructions intended for that execution unit. Circuitry is provided in the execution unit to avoid stalling in the dispatch of sendguard instructions even in the context of earlier guard modifying instructions.

23 Claims, 10 Drawing Sheets

U.S. PATENT DOCUMENTS

| | | | |
|---|---|---|---|
| 5,651,125 | A | 7/1997 | Witt et al. |
| 5,748,936 | A * | 5/1998 | Karp et al. ............... 712/218 |
| 5,859,999 | A | 1/1999 | Morris et al. |
| 5,889,984 | A | 3/1999 | Mills |
| 5,974,537 | A | 10/1999 | Mehra |
| 6,041,399 | A | 3/2000 | Terada et al. |
| 6,119,221 | A | 9/2000 | Zaiki et al. |
| 6,216,215 | B1 | 4/2001 | Palanca et al. |
| 6,374,346 | B1 * | 4/2002 | Seshan et al. ............ 712/221 |
| 6,393,026 | B1 | 5/2002 | Irwin |
| 6,452,857 | B1 | 9/2002 | Alofs et al. |
| 6,553,478 | B1 | 4/2003 | Grossier |
| 6,678,818 | B1 | 1/2004 | Cofler et al. |
| 6,701,425 | B1 | 3/2004 | Dabbagh et al. |
| 6,711,668 | B1 | 3/2004 | Wojcieszak et al. |
| 6,718,452 | B1 | 4/2004 | Wojcieszak et al. |
| 6,725,357 | B1 | 4/2004 | Cousin |
| 6,725,365 | B1 | 4/2004 | Cofler et al. |
| 6,732,276 | B1 | 5/2004 | Cofler et al. |
| 6,742,131 | B1 | 5/2004 | Wojcieszak et al. |
| 6,769,049 | B1 | 7/2004 | Bernard et al. |
| 6,807,626 | B1 | 10/2004 | Cofler et al. |
| 6,854,049 | B2 * | 2/2005 | Cofler ..................... 712/225 |

FOREIGN PATENT DOCUMENTS

| | | |
|---|---|---|
| EP | 0 490 524 A2 | 6/1992 |
| EP | 1 050 805 A1 | 11/2000 |

OTHER PUBLICATIONS

Intel Corporation, "IA-64 Application Developer's Guide," May 1999, p. 11-13.*

"Condition Register Coherency Look-Ahead" Research Disclosure, Kenneth Mason Publications, Hampshire, GB, No. 348, Apr. 1,k 1993, p. 243.

Labrousse J. et al. "Create-Life: A Modular Design Approach For High Performance ASIC's" Computer Society International Conference (COMPCON, Spring Meeting, Los Alamitos, Feb. 26-Mar. 2, 1990, No. CONF. 35, Feb. 26, 1990, pp. 427-433, XP000146217, Institute of Electrical and Electronics Engineers ISBN: 0-8186-2028-5.

Hennessy and Patterson, Computer Architecture—A Quantitative Approach, $2^{nd}$ Edition, 1996, pp. 147-150.

Intel Corporation, "1A-64 Application Developer's Architecture Guide", May 1999, pp. 3-3, 4, 14, 4-10, 7-3, 8, 19, 41, 127, 166.

* cited by examiner

HIGH PRIORITY GUARD TRANSFER FOR EXECUTION CONTROL OF DEPENDENT GUARDED INSTRUCTIONS

RELATED APPLICATIONS

This application is a continuation of U.S. patent application Ser. No. 10/743,333, filed Dec. 22, 2003 now abandoned, which in turn is a continuation of U.S. patent application Ser. No. 10/384,175, filed Mar. 7, 2003 now abandoned, which in turn is a continuation of U.S. patent application Ser. No. 10/272,492, filed Oct. 15, 2002 now abandoned, which in turn is a continuation of U.S. patent application Ser. No. 10/084,611, filed Feb. 27, 2002 now abandoned, which in turn is a Continuation-in-Part of, and claims priority under 35 U.S.C. §120 to, U.S. patent application Ser. No. 09/563,703 entitled "TRANSFER OF GUARD VALUES IN A COMPUTER SYSTEM", filed May 2, 2000 now abandoned, which applications are incorporated herein by reference.

BACKGROUND OF THE INVENTION

1. Field of the Invention

The present invention relates to computer systems, and particularly to processors, such as processors for digital signal processing (DSP's), and to a method for handling the transfer of guarded instructions in such computer systems.

2. Discussion of Related Art

A computer system affected by the present invention generally may include several processing units operating in parallel. Typical processing units may include an arithmetic and logic unit, an addressing unit and a branch-handling unit. In addition to these processing units, the computer system generally includes a control unit or central unit which carries on a dialogue with the program memory and issues individual instructions, also widely called micro-instructions, to the various processing units.

Among the instructions issued to the processing units, are included instructions called "guarded" instructions allowing higher-performance writing of the program code. A guarded instruction is an instruction assigned an indication called a guard indicator so that the execution or otherwise of the instruction is dependent upon the value of the guard indicator. The use of guarded instructions in a processor or computer system is already known to the person skilled in the art, for example from the European Patent Application No. 1 050 803 which is incorporated herein by reference. The principle of guarded instructions is reiterated briefly here; the person skilled in the art can refer for further details, if necessary, to the above-mentioned European Patent Application.

In practice, the guard indicator is typically a guard bit capable of taking the value 0 or 1. The guarded instruction will be executed or not executed depending on the value of the guard bit, that is to say on the guard indication. All the binary values of the guard indications, possibly numbering sixteen for example, are contained in a register called "guard-indication register". This centralized register is incorporated within a processing unit, for example the arithmetic and logic unit, and, at every instant, contains the current values of the guard indications or bits. The values of these guard indications can be modified by specific instructions called "modifying instructions."

In order to read the value of a guard indication associated with a guarded instruction, the processing unit which receives this guarded instruction, and which does not have direct access to the guard-indication register (for example the branching unit), requires a transfer of the value of the guard indication from the processing unit which is holding the guard-indication register. In other words, the issuing of a guarded instruction to a processing unit which does not hold the guard-indications register causes the issuing to the processing unit which is the holder of the guard-indications register of an instruction called a "transmission" instruction, which is intended to make the processing unit which receives the guarded instruction transmit the value of the guard indication associated with this guarded instruction.

The guarded instruction is kept in the header stage (output stage) of the FIFO first in/first out-type instruction memory associated with this processing unit, until the latter receives, from the processing unit which is holding the guard-indications register, said guard-indications value associated with this guarded instruction. It is only when the processing unit which holds the guard-indications register has executed the transmission instruction that the corresponding value of the guard indication will be transmitted to the requesting processing unit, so that it can execute or not execute its guarded instruction.

In a computer system which requires the transfer of guard values between parallel execution units, it is important that the transfer of guard values is accomplished as promptly and efficiently as possible. This, however, should be done without transferring incorrect guard values and, preferably, without stalling the operation of the pipelined execution units.

If, for one reason or another, the transmission instruction is blocked in the instruction memory of the processing unit which holds the guard-indications register, the requesting unit will consequently also be blocked until it receives the value of the corresponding guard indication. Problems sometimes arise when a plurality of instructions are executed simultaneously in a plurality of parallel execution units. This may arise in computer systems operating in superscalar or very long instruction word (VLIW) instruction modes so that the execution of some instructions may affect the guard values to be associated with other instructions in parallel execution units. Problems may also arise from pipelined execution of instructions so that the execution of some later instructions commences prior to the completion of execution of earlier instructions in the pipeline.

The invention envisages affording a solution to these problems.

SUMMARY OF THE INVENTION

An object of the invention is to provide a mechanism for handling guarded instructions which can enhance the general performance of a processor using a centralized guard-indications register.

According to one embodiment, there is provided a computer system for executing instructions having assigned guard indicators, the system comprises instruction supply circuitry, a plurality of parallel execution units for receiving respective instructions from the supply circuitry, each instruction having a respective guard indicator selected from a set of guard indicators common to the plurality of execution units. One of said execution units includes a master guard value store containing a master representation of current values for the guard indicators in said set of guard indicators and guard value transfer circuitry operable to transfer a guard value from said master store to another of said execution units in response to a sendguard instruction being executed in said one execution unit. The instruction supply circuitry comprises a main instruction queue for holding instructions to be supplied to the parallel execution units and a subsidiary instruction queue for holding sendguard instructions, with the subsidiary queue having priority access to the execution pipelines to avoid unnecessary delays for execution of sendguard instructions.

According to another embodiment, there is provided a method of executing instructions in a computer system, said instructions having assigned guard indicators, method comprises supplying a plurality of instructions to parallel execution units, each instruction having a respective guard indicator selected from a set of guard indicators common to the plurality of execution units, holding a master set of current values for the guard indicators in one execution unit, effecting a transfer of the master guard value from said one execution unit in response to a sendguard instruction being executed in said one execution unit wherein instructions to be supplied to the parallel execution unit, save for said sendguard instructions, are held in a main instruction queue, and wherein said sendguard instructions are held in a subsidiary queue having priority access to the execution pipelines to avoid unnecessary delays for execution of sendguard instructions.

In one example, there is a separate queue for sendguard instructions which has priority access to the execution pipeline. If this is done in the context of using guard value modifying instructions which can modify guard values and which are held in the main instruction queue, it is important to check before each sendguard instruction is supplied to the execution pipeline that no earlier guard value modifying instructions affecting the guard value requested by the sendguard instruction are still waiting in the main instruction queue.

According to a further aspect of the invention, there is provided a pipelined execution unit for a computer system which comprises at least two pipelined stages, with an earlier one of the pipelined stages including sendguard circuitry responsive to a sendguard instruction to dispatch a guard value for a guard indicator defined in the sendguard instruction, and a later one of the pipelined stages including guard value modifying circuitry for executing guard value modifying instructions which cause the value of a guard indicator to be modified, the pipelined execution unit further comprising: a master guard value store for holding a master representation of current values for guard indicators; and means for determining any dependencies between a sendguard instruction in the earlier pipelined stage and a guard modifying instruction in the later pipelined stage; and switching circuitry for selecting when a send guard instruction is executed and responsive to any such dependencies, whether a guard value held in the master guard value store or a guard value just modified by the guard value modifying circuitry is to be dispatched.

According to a further aspect of the invention there is provided a method of executing instructions in a pipelined execution unit, each instruction having a respective guard indicator selected from a set of guard indicators and execution of the instructions being predicated on the values of the guard indicators, wherein the instructions include a sendguard instruction which, when executed, causes the transfer of a guard value from the pipelined execution unit and a guard value modifying instruction which modifies the value of a guard indicator. The method comprises supplying instructions to the pipelined execution unit including said sendguard instructions and said guard value modifying instructions, checking dependencies between guard value modifying instructions supplied to the pipelined execution unit earlier than a sendguard instruction relating to the same guard indicator, and supplying the guard value of the guard indicator requested in the sendguard instruction selectively from a master guard value store or guard value modifying circuitry in dependence on the results of said dependency checks, so as to ensure that the guard value of a guard indicator which is dispatched responsive to a sendguard instruction is correct in relation to any earlier guard value modifying instructions in the pipelined execution unit.

According to one embodiment described herein, each execution unit comprises a plurality of pipelined stages with synchronized pipeline cycles for each of the execution units. Circuitry is provided to allow for prompt dispatch of a guard value requested by a sendguard microinstruction, regardless of its dependency on earlier guard value modifying instructions in the pipeline, and without stalling the pipeline.

Another embodiment includes a method of handling guarded instructions within a processor, this processor including several processing units associated respectively with memory means of the FIFO (first in-first out) type for sequentially storing the respective instructions which are intended for the corresponding units. A first unit, for example an arithmetic and logic unit, contains a guard-indications register. Furthermore, the issuing of a guarded instruction to the memory means of a second processing unit, for example the branching unit or else the addressing unit, causes the issuing to the memory means of the first processing unit of an instruction called a "transmission" instruction intended to have the value of the guard indication associated with said guarded instruction transmitted to the second unit.

According to one general characteristic of the invention, the memory means of the first unit includes a first FIFO-type memory, and a second FIFO-type memory separate from the first one. Each transmission instruction is stored in the first memory and all the other instructions intended for the first processing unit are stored in the second memory. These other instructions may be "modifying" instructions intended to modify guard-indication values, or else any other instruction except for a transmission instruction.

In one example, a transmission instruction having reached the head of this first memory is then extracted from the first memory, if no modifying instruction, earlier in time and intended to modify the value of the guard indication associated with this transmission instruction, is present in the second memory. In the presence of such an earlier modifying instruction in the second memory, the transmission instruction is extracted from the first memory only after the modifying instruction has been extracted from the second memory. In other words, a transmission instruction can "short-circuit" all the other instructions if no earlier instruction stored in the second memory is of such a nature as to modify the value of the guard indication associated with this transmission instruction.

According to another example, every time an instruction is extracted from the second memory, a read counter is incremented. Likewise, every time an instruction is stored in the second memory, a write counter is incremented. Furthermore, every time an instruction modifying the value of a guard indication is stored in the second memory, the current value of the write counter is stored in memory. Determining of the still-present character of a modifying instruction in the second memory takes account of the result of the comparison of said memory-stored current value of the write counter with the current value of the read counter. In other words, it is determined whether a modifying instruction which has already been written into the second memory is still present in this second memory, by using the comparison of the memory-stored current value of the write counter with the current value of the read counter. In one example, the read counter and the write counter advantageously have an identical binary size equal to the depth of the second memory.

According to one implementation of the method, an overflow bit changing value every time the corresponding counter comes back to its initial value is then associated with each counter. Every time an instruction modifying the value of a guard indication is stored in the second memory, the current value of the overflow bit of the write counter is likewise stored in memory. In order to take account of the fact that the read pointer and the write pointer of the second memory can lie in two different "circular" windows, the determining of the still-present character of the modifying instruction in the second memory also takes into account the result of the comparison of the current value of the overflow bit of the read counter with said memory-stored value of the overflow bit of the write counter.

As regards the transmission instructions, according to one implementation of the method according to the invention, every time a transmission instruction is stored in the first memory and another instruction is not simultaneously stored in the second memory, a non-operative instruction (NOP instruction according to nomenclature well known to the person skilled in the art) is stored simultaneously in the second memory.

Furthermore, every time a transmission instruction is stored, a "label" including the current value of the write counter which was stored in memory when the last instruction modifying the guard indication associated with said transmission instruction was stored in the second memory is associated with said transmission instruction. The criterion for extraction of this transmission instruction having reached the head of the third memory then takes into account the result of the comparison between said memory-stored current value associated with this transmission instruction (contained in the label), and the current value of the read counter.

In one example, a the current value of the read counter is compared with the current value of the write counter which was stored in memory when the last instruction modifying the guard indication associated with this transmission instruction was stored in the second memory. The extraction of the transmission instruction having reached the head of the memory may be authorized when the current value of the read counter is higher than the memory-stored current value contained in the label which was attached to this transmission instruction. However, it is appropriate to take account especially of the case where a modifying instruction is written while the write counter is in a given circular window and while the read counter is still positioned in the preceding circular window.

According to another implementation of the method according to the invention, every time a transmission instruction is stored in the first memory, the current value of the overflow bit of the write counter which was stored in memory when the last instruction modifying the guard indication associated with said transmission instruction was stored in the second memory is associated with it, also in its label. The criterion for extraction likewise takes into account the result of the comparison between this memory-stored current value of the overflow bit of the write counter, contained in the label attached to this transmission instruction, and the current value of the overflow bit of the read counter.

Yet another embodiment of the invention is a processor comprising several processing units associated respectively with FIFO-type memory means for sequentially storing the respective instructions which are intended for the corresponding units. A first processing unit contains a guard-indications register. The processor furthermore includes a central unit able to issue a guarded instruction to the memory means of a second processing unit, and to issue, to the memory means of the first processing unit, a transmission instruction intended to have the value of the guard indication associated with said guarded instruction transmitted to the second processing unit.

According to one example, the memory means of the first unit includes a first FIFO-type memory and a second FIFO-type memory separate from the first one. The processor furthermore includes routing means ("dispatcher"), able to store each transmission instruction in the first memory and to store all the other instructions intended for the first processing unit in the second memory, and control means capable of extracting from the first memory a transmission instruction having reached the head of this first memory if no earlier modifying instruction intended to modify the value of the guard indication associated with this transmission instruction is present in the second memory. In the presence of such an earlier modifying instruction, of extracting the transmission instruction from the first memory only after the modifying instruction has been extracted from the second memory.

According to one embodiment of the invention, the control means include a read counter incremented every time an instruction is extracted from the second memory, a write counter incremented every time an instruction is stored in the second memory, a set of individual registers associated respectively with the set of guard indications, a first control unit able, whenever an instruction modifying the value of a guard indication is stored in the second memory, to store the current value of the write counter in a main field of the individual register associated with this guard indication. The control means further includes a second control unit able to determine the still-present character of this modifying instruction into the second memory, this second control unit including comparison means able to compare the content of said main field of the individual register with the current value of the read counter.

According to one embodiment of the invention, the write counter and the read counter have an identical binary size equal to the depth of the second memory. An overflow bit, changing value every time the corresponding counter comes back to its initial value, is associated with each counter. Each individual register further includes a one-bit auxiliary field. The first control unit is then able, every time an instruction modifying the value of a guard indication is stored in the second memory, also to store the current value of the overflow bit of the write counter in the auxiliary field of the corresponding individual register. The second control unit then includes auxiliary comparison means able to compare the current value of the overflow bit of the read counter with the content of the auxiliary field. In one example, the first auxiliary comparison means include an EXCLUSIVE NOR (XNOR) logic gate.

According to yet another embodiment of the invention, each stage of the first memory includes a field which is usable for the storage of a transmission instruction, and a first supplementary field. (This first supplementary field will make it possible store a part of the label attached to the transmission instruction, typically the memory-stored value of the write counter). The control means then includes a third control unit able, every time a transmission instruction is stored in the usable field of the input stage of the first memory, to transfer the content of the main field of the individual register associated with the corresponding guard indication into the first supplementary field of the input stage of the first memory, and a fourth control unit able to derive the criterion for extraction of this transmission instruction having reached the header stage of the first memory, this fourth control unit including comparison means able to compare the content of the first supplementary field of the header stage with the current value of the read counter.

According to one embodiment of the invention, each stage of the first memory further includes a second supplementary field. This second supplementary field, for example one supplementary bit, will make it possible to store another part of the label attached to the transmission instruction, typically the memory-stored value of the overflow bit of the write counter. The third control unit is then able, every time a transmission instruction is stored in the usable field of the input stage of the first memory, to transfer the content of the auxiliary field of the individual register associated with the corresponding guard indication, into the second supplementary field of the input stage of the first memory. The fourth control unit then includes supplementary comparison means able to compare the content of the second supplementary field with the current value of the overflow bit of the read counter. The supplementary comparison means may include an EXCLUSIVE NOR (XNOR) logic gate.

BRIEF DESCRIPTION OF THE DRAWINGS

The foregoing and other objects, features and advantages of the system and method may be apparent from the following non-limiting description of various illustrative embodiments and aspects, and from the accompanying figures. It is to be appreciated that the figures are for the purpose of illustration and are not intended to be interpreted as a definition of the limits of the invention. In the drawings, in which like reference numerals represent like elements throughout the different figures.

DETAILED DESCRIPTION

Figure 1:
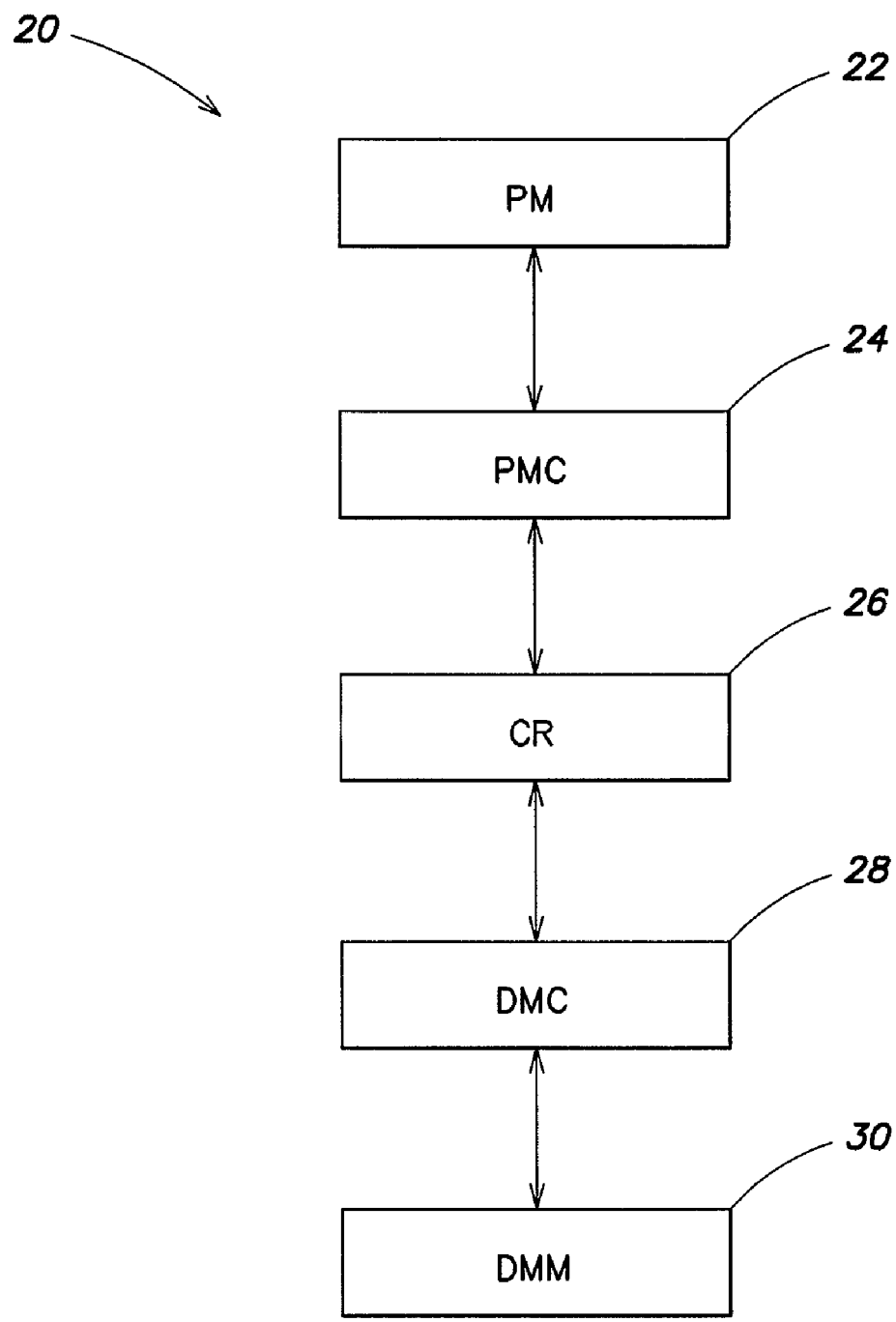
FIG. 1 is a block diagram representation of an example of a computer system according to the invention.

Referring to FIG. 1, there is illustrated a computer system, such as a processor 20, for example a processor for digital signal processing. The processor 20 includes a program memory 22 containing the program instructions. This program memory 22 is addressed by a memory controller 24 which interacts with the core 26 of the processor 20. The core 26 of the processor 20 also carries on a dialogue with a memory controller 28 which controls access to a data memory 30, which may be, for example, two banks of SRAM memory.

Figure 2:
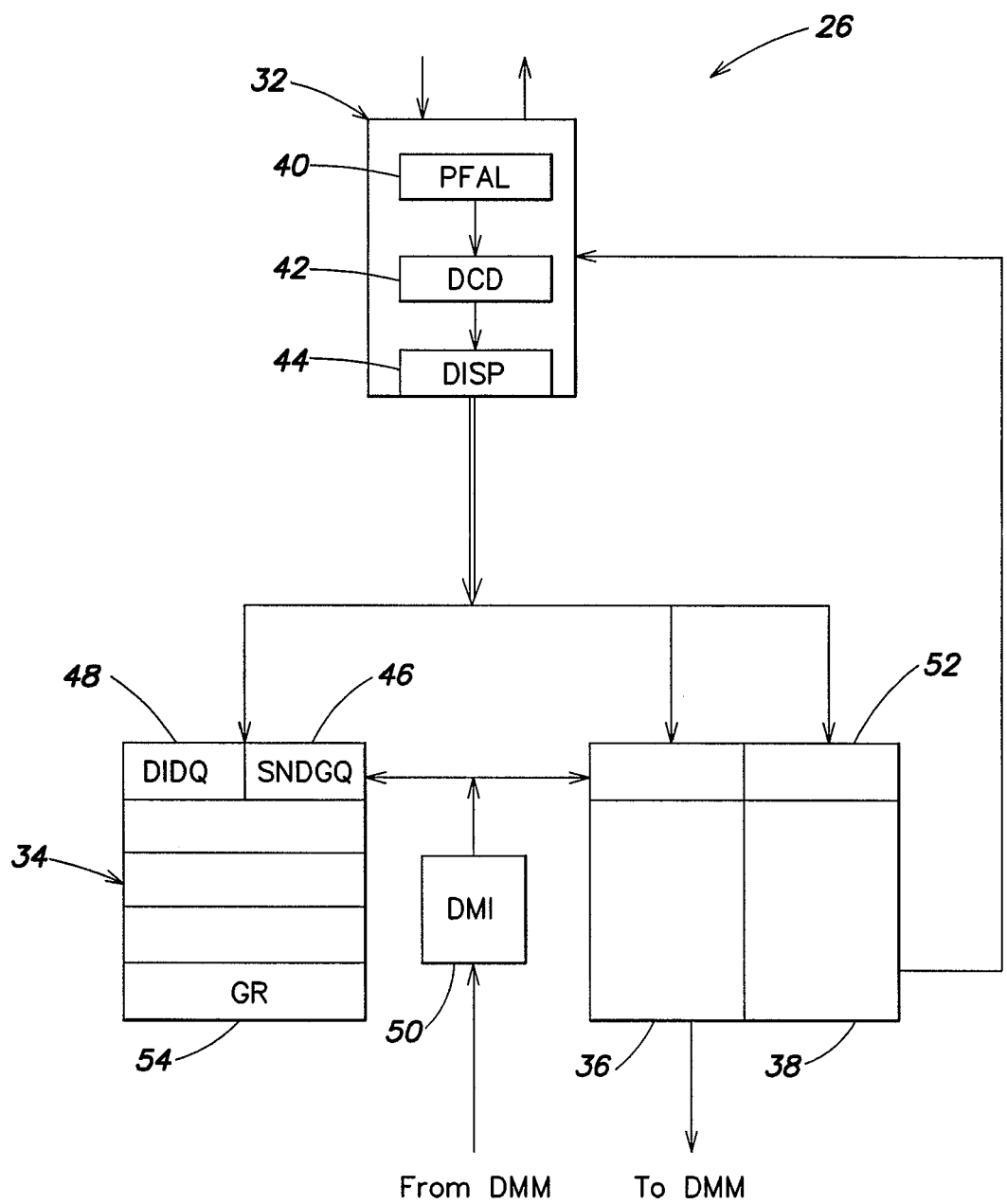
FIG. 2 is a block diagram representation of one example of a core forming part of the computer system of FIG. 1.

Referring to FIG. 2, it may be seen that the core 26 of the processor 20 includes a central unit 32 and several processing units, here three different processing units 34, 36 and 38. The central unit 32 is the master unit of the system. In general, it manages all the control activities. More particularly, it issues program addresses to the memory controller 24 (see FIG. 1), and distributes the corresponding instructions to the various processing units. More precisely, the central unit 32 includes an interface 40 with the memory controller 24, which particularly carries out formatting of the instructions into instructions ready to be decoded. The instructions are then decoded in a decoder 42 which converts each machine instruction into one or more micro-instructions which can be dealt with by the various processing units. In the remainder of the text, for the sake of simplification, the term "instruction" will designate a micro-instruction. Finally, a routing means 44 ("Dispatcher") sends the instructions generated by the decoder to the processing units for which these instructions are intended.

The processing units of the processor core 26 here include an arithmetic and logic unit 34 which executes the majority of the arithmetic operations. An addressing unit 36 is furthermore provided, which performs the actual address calculations necessary for addressing the operands in the memory. This address unit 36 contains all the registers necessary for this task. A third processing unit is a branching unit 38 which carries out all the address-branching calculations and transfers them to the central unit 32. The processing unit 34 includes a memory means of the FIFO type consisting, as will be seen in further detail below, of a first memory 46 intended to store transmission instructions and a second memory 48 intended to store all the other instructions intended for this address unit 34, in particular modifying instructions intended to modify guard-indications values.

In addition to these units 34, 36 and 38, a memory interface 50 is provided, which especially contains another FIFO-type memory intended to receive and to store, temporarily, the data contained in the SRAM memory banks. Furthermore, in the same way as the unit 34 includes a FIFO-type memory unit, each other processing unit, namely the address unit 36 and the branching unit 38, likewise contain a FIFO-type memory means 52, and intended to store the instructions intended for these processing units. Furthermore, one of the processing units, for example the address unit 34, includes a guard-indications register 54. This register stores the current values of all the guard indications, which are, for example, equal to sixteen in number. It is reiterated here that an instruction can be guarded. This means that this instruction is allocated a guard indication, taken from among the sixteen guard indications of the register 54, and, depending on the value of this guard indication, the instruction will or will not be executed.

Figure 3:
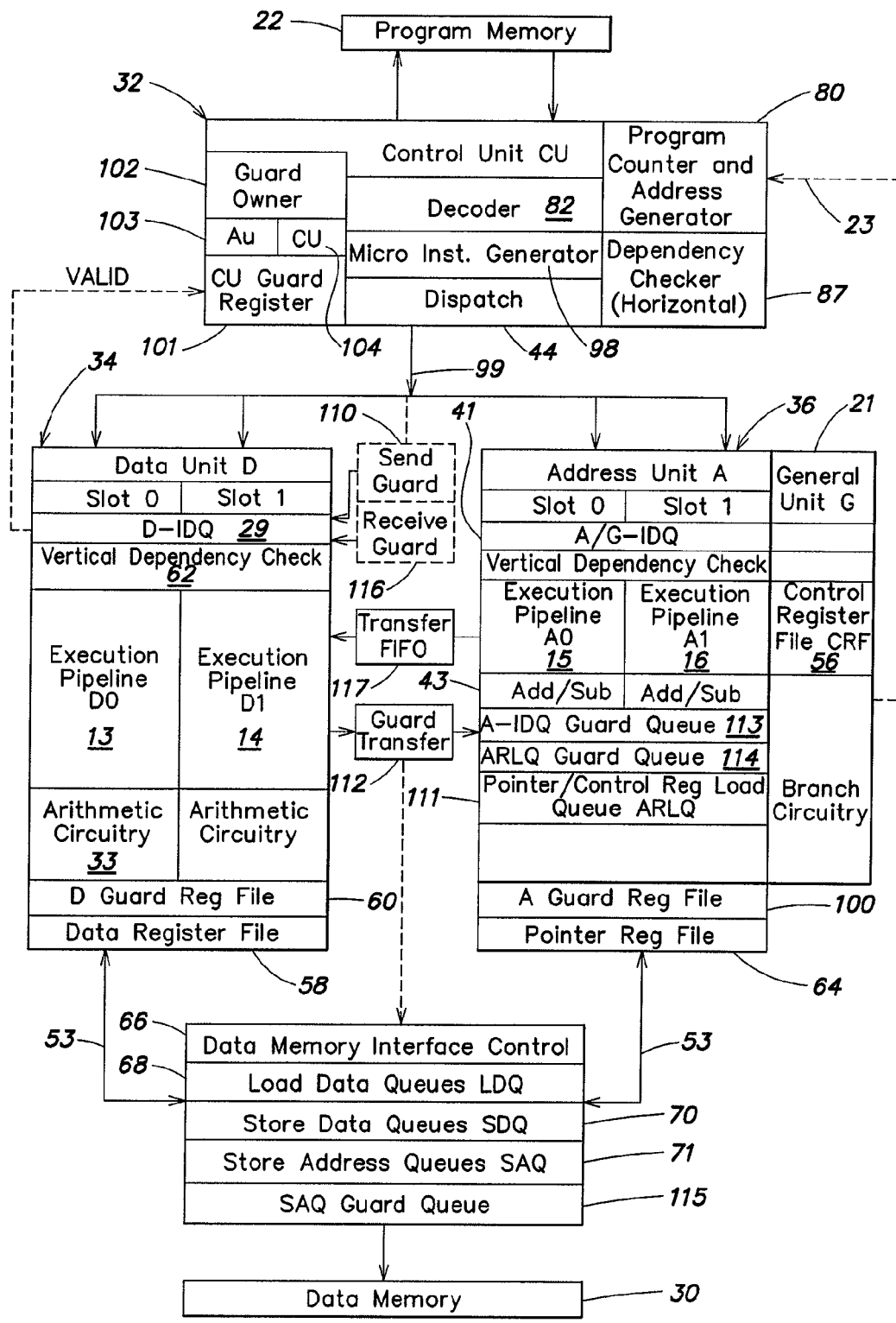
FIG. 3 is a detailed block diagram of one example of the computer system of FIG. 1.

FIG. 3 illustrates in more detail another example of a computer system or processor 20. The computer system of this example is arranged for the parallel execution of a plurality of instructions and is particularly suited to providing a high digital signal processing (DSP) performance. Instructions are held in a program memory 22 and after passing through a control unit 32 are supplied to four parallel execution pipelines 13, 14, 15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 36 used to execute instructions for memory accesses to a data memory 30. Slot 1 or Slot 0 of the address unit 36 may also be used to supply instructions to a general unit 21 which shares some resources with the address unit 36. The general unit 21 includes a control register file 56 as well as branch circuitry which is used to provide instruction branch information on line 23 to the control unit 32.

The two pipelines 13 and 14 in the data unit 34 share a common data register file 58 and a common guard register file 60 holding the master guard values which may be associated with the instructions. The two pipelines also derive instructions from a common instruction dispatch queue (D-IDQ) 29 in the data unit 34 and instructions in the queue 29 are checked for data dependency by common vertical dependency check circuitry 62 in the data unit 34. The sequence of operations in each of the pipeline stages in the data unit 34 include an operand fetch usually accessing one of the register files 58 or 60 followed by two execution stages which may use arithmetic circuitry 33 followed by a data write stage at which the result of an arithmetic operation is returned to the register files 58 and 60. A similar pipeline exists for both pipelines 13 and 14 on the data unit 34.

Similarly for the address unit 36, both pipelines 15 and 16 access a common register file 64 holding pointer values for use in load or store operations in the data memory 30. The two pipelines each take their instructions from a common instruction dispatch queue (A-IDQ) 41 and a similar vertical dependency check is provided in common for both pipelines 15 and 16 in the address unit 36. The vertical dependency check is similar to that already referred to in the data unit 34. In executing instructions through the two pipelines 15 and 16, accesses will be made to the register file 64. Add and subtract units 43 may be used in execution of the instructions. Each of the pipelines 15 and 16 in the address unit 36 includes an operand fetch followed by an execution stage and an address write back stage.

Both the data unit 34 and the address unit 36 are connected to the data memory 30 through a data memory interface control 66. The control 66 is connected by buses 53 to both the data unit 34 and the address unit 36. The interface control 66 includes a plurality of queues each connected to the buses 53. These queues include load data queues (LDQ) 68 for data awaiting loading into register files of the data unit 34 or address unit 36. The interface control 66 also includes store data queues (SDQ) 70 for data awaiting storage in the memory 30. Store address queues (SAQ) 71 are provided to indicate the locations in the memory 30 at which the data is to be stored.

It will be understood that when instructions are executed to load data from the data memory 30 into the data register files of the data unit 34, the address unit 36 will access the data memory 30 and load the required data into the load data queues 68 prior to completing the update of the data register file 58 by transferring the data from the appropriate queue 68. Similarly when instructions are executed to store data from the data unit 34 into the data memory 30 the appropriate data may be held in the store data queues 70 together with the store addresses in queue 71 prior to completing the store operation in the data memory 30.

By executing the memory addressing instruction in the address unit 36 in separate parallel pipelines from those provided in the data unit 34, the computer system operates access decoupling in that the memory accesses are effected independently of the arithmetic operations carried out within the data unit 34. This reduces the problem of memory latency. In a digital signal processing system which operates regular and repeated operations the memory latency can be hidden from the executing program. In the above description, all instructions which are fed through pipelines 13, 14, 15 and 16 are subject to a vertical dependency check and if any data dependency is found which cannot be resolved by a bypass, the execution unit operates to cause a temporary stall in one of the pair of pipelines 13 or 14 or in the pair 15 and 16 so as to cause a temporary delay in one of the pipelines of the pair so as to resolve the data dependency. It will be understood that a check for a data dependency includes any form of data, including data representing guard values. The circuitry described in the following, however, reduces the likelihood of stalling on guard dependencies.

The control unit 32 is also arranged to provide a horizontal dependency check. In this specification a data dependency between instructions that are supplied to the parallel pipelines in the same machine cycle is referred to as a horizontal dependency. The control unit 32 includes a program counter and address generator 80 to provide a memory address for an instruction fetch operation from the program memory 22. The machine may operate in a selected one of a plurality of instruction modes including superscalar modes of variable instruction bit length or in very long instruction word (VLIW) mode. The control unit 32 may include a process status register to indicate the instruction mode in which the machine is operating.

In use, a plurality of instructions are obtained from the memory 22 in a single fetch operation during one cycle and are decoded by a decoder 82 in the control unit 32. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 44 through parallel paths 100 to the four parallel execution pipelines 13, 14, 15 and 16 and for the general unit 21. If a horizontal dependency was located, the microinstructions on lines 100 would include an indication to the instruction dispatch queues of the data unit 34 or address unit 36 that some action, such as a pipeline stall, was necessary in the execution pipelines to resolve the horizontal dependency.

Figure 4:
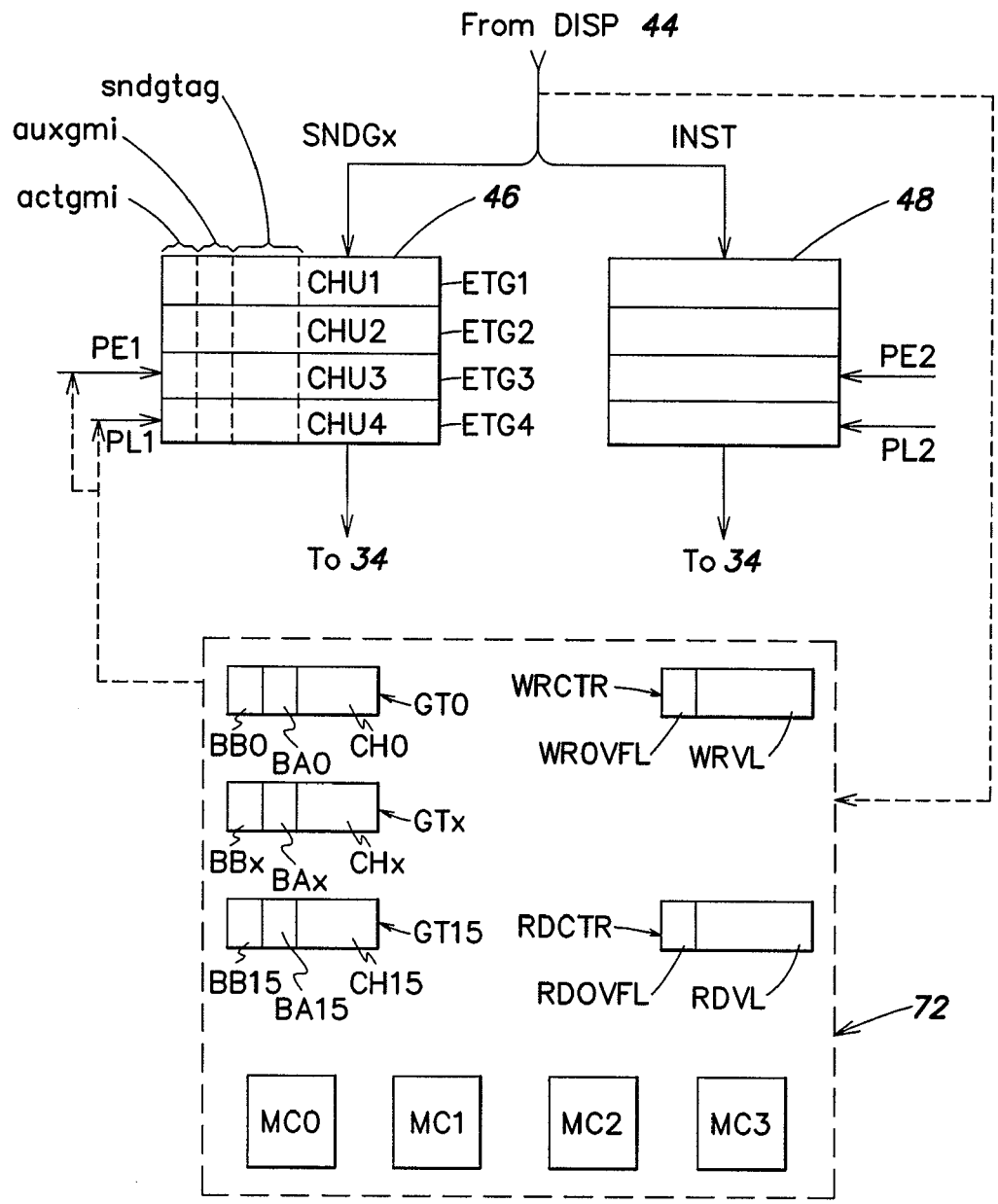
FIG. 4 is diagrammatic representation of a flow-chart illustrating a method of handling guarded instructions, according to the invention.
Figure 5:
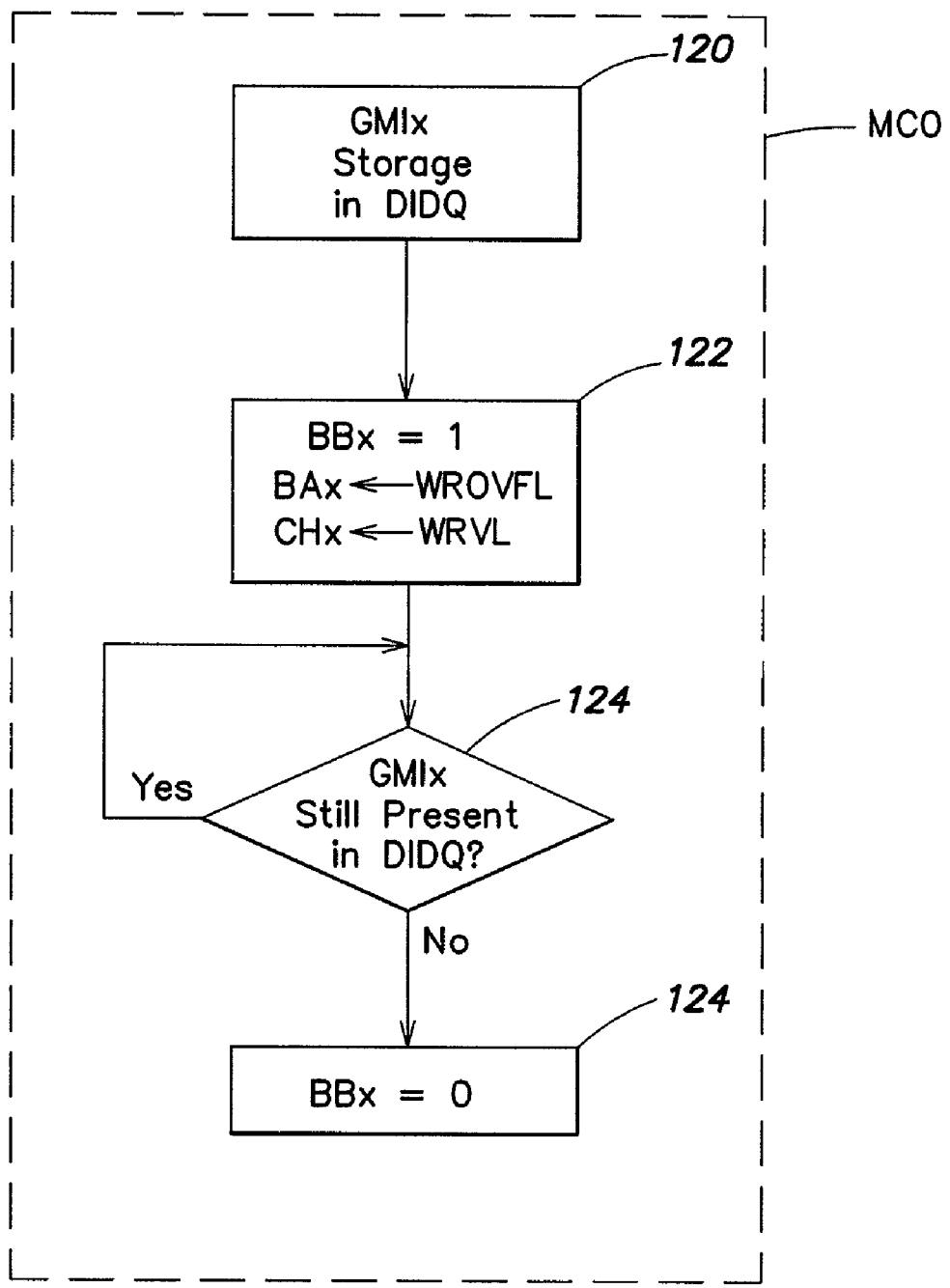
FIG. 5 is a flow-chart illustrating in more detail one component of the method of FIG. 4.
Figure 6:
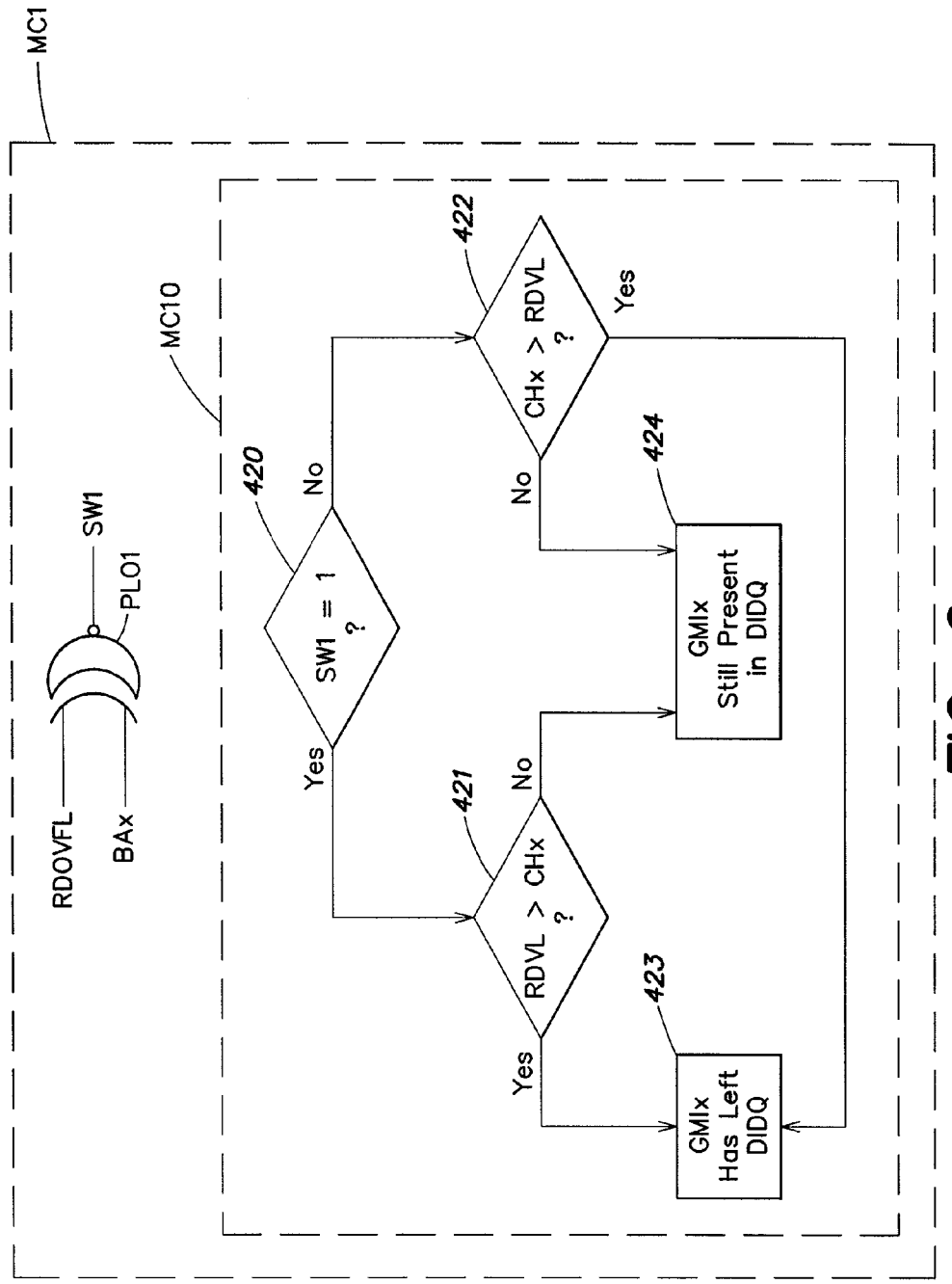
FIG. 6 is a flow-chart illustrating in more detail one component of the method of FIG. 4.

Referring now more particularly to FIG. 4, a mechanism according to the invention for handling guarded instructions in the systems of FIGS. 1-3 will be described. When a guarded instruction is issued to the memory means 52 of a processing unit, for example the address unit 36 or the branching unit 38, which does not hold the guard-indications register 54, this issuing causes the issuing to the memory means of the processing unit 34 which contains the guard-indications register, of an instruction called "transmission" instruction intended to have the value of the guard indication associated with said guarded instruction which has been issued to the units 36 or 38 transmitted to the units 36 or 38.

As shown in FIG. 4, the reference SNDGx designates such a transmission instruction, and x designates the number of the guard indication Gx associated with the guarded instruction which has been issued to one of the units 36 or 38. As indicated above, the memory means associated with the unit 34 includes a first FIFO-type memory 46, and a second FIFO-type memory 48. This first memory 46 includes several stages (here four), referenced ETG1-ETG4. Each stage ETGi includes a usable field CHUi for storage of a transmission instruction SNDGx. The writing and the reading in the first memory 46 are managed by a write pointer PE1 and a read pointer PL1. A transmission instruction SNDGx which would have been stored in the stage ETG1 will then be propagated sequentially from the input stage ETG1 of the memory up to the output stage ETG4, or header stage, of the memory 46. Needless to say if, at a given instant, the FIFO is partially filled or empty, an instruction could be stored directly at the first available stage, for example ETG2, or ETG3, or even ETG4, as is well known to the person skilled in the art. Hence, in the sense of the present invention, the input stage is therefore not necessarily the stage ETG1.

The second memory 48 is intended to store all the other instructions INST intended for the unit 34, and especially the instructions known as "modifying" instructions, that is to say those intended to modify the value of a guard indication stored in the guard-indications register 54. A modifying instruction intended to modify the value of the guard indication bearing the number x is referenced in the rest of the text by GMIx. The writing and the reading in this second memory 48 are likewise managed in the conventional way by a write pointer PE2 and a read pointer PL2. The two memories 46, 48 have, in the example described here, the same depth (size) equal to four. It should also be noted that the pointers PE1 and PL1 associated with the memory 46 are decorrelated (that is to say controlled independently) with respect to the pointers PE2 and PL2 associated with the memory 48.

In addition to these two FIFO-type memories, the processor includes control means 72, incorporated, for example, within the unit 34. These control means 72, as will be seen in greater detail below, will make it possible to issue the transmission instructions SNDGx much more quickly to the pipelined processing stages of the unit 34, and consequently to the guard-indications register 54, so as to allow issuing of the guard-indications value associated with the guarded instruction which is awaiting execution in the memory means associated with another processing unit, for example the unit 38.

More precisely, these control means 72 will extract from the memory 46 a transmission instruction SNDGx having reached the head ETG4 of this memory 46, if no instruction GMIx, which is earlier in time and intended to modify the value of the guard indication Gx associated with this transmission instruction SNDGx, is present in the memory 48. The control means 72 will, in the presence of such an earlier modifying loading instruction GMIx stored in the second memory 48, extract the transmission instruction SNDGx as soon as the modifying instruction GMIx has been extracted from the memory 48.

According to one example, each instruction may be provided with a guard indicator G between G0 and G15. If a guard is true, then the instruction is executed (i.e. updates the architectural state of machine); if a guard is false the architectural state of machine is not changed by instruction execution. Resolution of a guard may be done in different pipeline stages of the machine.

Referring again to FIG. 3, the guard for each instruction may be selected between G0 and G15, as mentioned above, and in this particular example the guard G15 is always true. The value true or false attributed to guards G0-G14 is however dependent upon the guard values held at any particular time in a guard register file. The master guard register file in this example is guard register file 60 (sometimes referred to herein as the architectural guard register) in the data unit 34. However, a supplementary or shadow guard register file (normally copies of the master file 60) is provided by a control unit guard register file 101 in the control unit 32. The control unit 32 also includes a register 102 to indicate which unit is currently known to be the guard owner in respect of each guard indicator. Register 102 has a first bit 103 for each guard indicator which if holding the value 1 indicates that the address unit 36 is currently the guard holder for that indicator. If bit 104 for each guard indicator is set to the value 1 then it indicates that the control unit 32 is currently the guard owner for that guard indicator. If neither bit 103 nor 104 is set then the default condition indicates that the master guard register file 60 must be used so that the data unit 18 is the guard owner. The guard values held in the guard register files can be changed by a guard modifier instruction (GMI) executed by the data unit 34 or the address unit 36. The address unit also has a shadow guard register file 100 which may be updated by guard modifier instructions executed by the address unit 36. Instructions executed by the data unit will update the master file 60 and the shadow file 101 in the control unit. Those executed by the address unit will update the shadow file 100 and the master file 60 (and hence the shadow file 101 in the control unit).

In normal operation the guard register file 60 in the data unit 34 maintains the architectural state of the guard values G0 to G14 and the register file is common to both execution pipelines 13 and 14. The operative values of the guards are the same for all execution pipelines although as will be explained below, the different pipelines may access different register files to obtain the guard values. In this example the master register file for the guard values is held in the data unit 34 as it is the data unit that will most commonly execute instructions likely to change the value of the guards. Greater efficiency of execution cycles is therefore achieved by maintaining the master guard values in the register file which is directly accessed by execution of the instructions in the data unit 18. when instructions are fed through either slot 0 or slot 1 of the data unit 34 the required guard value may be taken directly from the master guard register file 60 in accordance with the guard indicator that accompanied the microinstructions fed into the data unit 34 from the control unit 32, unless the control unit 32 is the owner of the guard in which case the guard value will have been taken from the shadow registers 101 in the control unit 32.

In the case of instructions to the address unit 36, the more general position will be the default condition in the guard owner register 102 indicating that guard ownership does not belong to the address unit 36 or the control unit 32 and consequently the guard values required for execution of the instructions in the address unit 36 will need to be obtained from the guard register file 60 in the data unit 34. The microinstructions fed through lines 100 to the execution units will include supplying a "sendguard" (sndg) instruction to the data unit 34 at the same time as supplying the appropriate microinstruction to the correct slot of the address unit 36. The "sendguard" instruction will be initially slotted into the instruction dispatch queue 29 of the data unit 34 in the same cycle of operations as the microinstruction required for the address unit 36 is slotted into the instruction dispatch queue 41 for the address unit. All micro-instructions in a given execution unit are always executed in order and all guard manipulations and transfers are maintained in order with respect to these micro-instructions. This guarantees the synchronicity of guard transfers (i.e. for every guard emission from a given execution unit there is an opposite guard reception in another execution unit and all these are done in order. The control unit 32 has responsibility to generate the correct micro-instructions for guard transfers; the sending or receiving execution unit only sees the send or receive (respectively) micro-instruction i.e. the action that it must do). In this way the correct sequencing occurs with the correct guard value being obtained from the guard register file 60 corresponding to the instruction being executed in the address unit 36. The supply of the "sendguard" instruction in such a situation is illustrated at 110 in the drawing. As described in the following, a bypass mechanism for sendguard instructions is implemented which nevertheless respects the requirement for synchronicity of guard transfers.

The address unit 36 has a queue of instructions 41 awaiting dispatch to the execution units. It also has a queue 111 (ARLQ) of items awaiting loading into the pointer or control registers 64 or 56. There is also the queue 71 in the memory interface control 66 of store addresses queues awaiting a memory access as a result of partial execution of a store instruction in the address unit 36. When the address unit 36 awaits a guard transfer from the data unit 34, the instruction in the address unit 36 is stalled in the A-IDQ 41 or in the ARLQ 111 or in the store address queue 71 until the requested guard value is transmitted from the data unit 34 through guard transfer circuitry 112 to the required destination. The transfer of the correct guard value will occur when the data unit 34 executes in its pipeline operation the "sendguard" instruction and the guard value which is transferred to either the address unit 36 or the data memory interface control 66 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111 then the transferred guard value will be held in an ARLQ guard queue 114. In the case of a store instruction where the store address had been added to the SAQ 71 in the interface control 66, the guard value will be transferred from circuitry 112 to an SAQ guard queue 115 in the data memory interface control 66 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 66 prior to checking whether or not the guard value of the store instruction is true or false. The store operation will be held in the queue 71 until the guard value is checked and will only proceed to completion if the guard value is true. In each case where the guard value is transferred to the address unit 36 from the data unit 34, the stalled instruction for the address unit or general unit 21 will be resumed or rendered inoperative depending on the guard value transferred from the data unit file 60.

The use of the guard queues 113, 114 and 115 allow resynchronization of the guard values with the microinstruction that caused the request "sendguard" 110 to be sent to the data unit 34. The above description for operation of a guarded store instruction indicated how the effective store address could be put on the queue 71 prior to resolving the guard value. The address unit 36 may be operated with an earlier stall in the execution of a store instruction so that the effective address is not calculated and fed to the interface control 66 until after the guard value has been transferred and resolved. Similarly a guarded load instruction may be executed by the address unit 36 to access the memory and obtain the required data for addition to the load data queue 68 prior to resolving the guard value. Alternatively the address unit 36 may cause an earlier stall awaiting resolution of the guard value transferred from the data unit prior to obtaining the data from the memory and putting it into the queue 68. In the case where the data is obtained from the memory and put onto the load data queue 68 prior to resolution of the guard value, the appropriate register file 58, 64 or 56 is updated by a load operation from the load data queue 68 only if the guard value is found to be true. In the case of a false guard value, the register files are not updated and the appropriate execution unit effects a read of the load data queue 68 to remove the unwanted data from the queue without updating any destination register file.

As indicated above, the guard values to be assigned to the guard indicators G0-G14 can be modified by executing a guard modifier instruction. These can be executed by either the data unit 34 or the address unit 36. In the case of a guard modifier instruction executed by the data unit 34, the new guard value is calculated in the execution pipeline of the appropriate slot 0 or slot 1 of the data unit 34 and, whichever of these pipelines has been used, it will cause a new value of the guard to be written into the guard register file 60 at the end of the execution pipeline in order to update the register file 60. The guard modifier instructions may themselves be guarded.

In the case of the guard modifier instruction which is supplied to the address unit 36, the new value will be calculated on execution of the instruction in either slot 0 or slot 1 pipeline of the address unit 36 and the new value can be written into the address guard register file 100 of the address unit 36 at the end of the execution pipeline. However it is necessary for the new guard value to be transferred to the master guard register file 60 of the data unit 34 in order to update that master file at the correct cycle of operation. To achieve this, the control unit 32 arranges to supply a "receive guard" instruction to the data unit 34 simultaneously with the supply of any microinstruction to the address unit 36 which will cause a new guard value to be calculated by the address unit 36. This "receive guard" instruction is illustrated at 116 in the drawing and is added to the instruction dispatch queue 29 of the data unit 34 in the same cycle as the microinstruction generating a new guard value is supplied to the address unit 36. As soon as the execution pipeline in the address unit 36 has calculated the new guard value it is supplied to a transfer FIFO 117 to enable supply of the new guard value to the data unit 36. The "receive guard" instruction supplied to the data unit 34 is treated by the data unit 34 in the same way as a guard modifier instruction except that it does not need to calculate the new guard value but merely obtains it from the FIFO 117.

The microinstruction generating the guard value is supplied to the IDQ 41 of the address unit 36 in the same cycle as the "receive guard" microinstruction is fed to the IDQ 29 of the data unit 34. As explained above, synchronization is achieved between the two units so that the new guard value transferred through the FIFO 117 updates the master register file 60 at the correct point in the sequence of the instruction execution.

It is possible to execute a load GR instruction in order to load from memory 30 into the guard register files 60 and 100 of the data unit 34 in the address unit 36. This instruction is treated as a load data register and a load pointer register instruction and the correct value is obtained from memory and put into the load data queues 68. The transfer from the load data queues 68 to the address unit 36 and data unit 34 occurs independently and the data is maintained in the load data queue 68 until both units have read the appropriate data. The microinstructions in the instruction dispatch queues 29 and 41 necessary to load the guard registers 60 and 100 are stalled until the execution units of both the data unit 34 and the address unit 36 is empty of any guard modifier instructions. At that time the load guard register instructions can proceed to transfer the required value from the load data queue 68 into the guard register file without conflict with any other guard modifier instructions.

According to one embodiment, like the one illustrated in FIG. 4, the control means 72 includes a read counter RDCTR, circular, incremented every time an instruction, whatever it might be, is extracted from the second memory 48. The control means 72 furthermore includes a write counter WRCTR, circular, incremented every time an instruction, whatever it may be, is stored in the second memory 48. In the example described here, the two counters have an identical size. This identical size is a number of bits necessary to code, in binary terms, the depth of the second memory 48. In the example illustrated, since the memory 48 has a depth of four, the counters are counters over two bits, that is to say that the current value WRVL of the write counter WRCTR and the current value RDVL of the read counter RDCTR are two-bit words. Needless to say, the depth of the FIFO may be greater. Furthermore, an overflow bit (WROVFL in the case of the write counter and RDOVFL in the case of the read counter) is associated with each counter. This overflow bit changes value every time the corresponding counter comes back to its initial value. In other words, at the rate of the successive circular counting windows, the overflow bit successively takes the values 0 and 1.

In addition to the write counter and the read counter, the control means 72 includes a set of individual registers GT0-GT15, associated respectively with the set of the guard-indications registers G0-G15, as described above. Thus, the individual register GTx is associated with the guard indication Gx bearing the number x. Each individual register GTx includes a main field CHx, as well as a first auxiliary field BAx and a second auxiliary field BBx. The meaning and the function of these auxiliary fields which, in the example described here, are one-bit fields, will be returned to in further detail. The control means 72, furthermore, includes four control units MC0-MC3 the functionality of which will now be described in more detail by referring to FIGS. 5-8.

The first control unit MC0 is able, every time an instruction GMIx modifying the value of the guard indication Ox is stored in the second memory 48 (stage 120, FIG. 5), to store the current value WRVL of the write counter WRCTR in the main field CHx of the individual register GTx associated with the guard indication Gx. Furthermore, the bit BBx (second auxiliary field) of the individual register GTx, initially at 0, takes the value 1 to indicate that a modifying instruction GMIx has actually been stored in the memory 48 (DIDQ) (stage 122). Finally, the current value of the overflow bit WROVFL of the write counter is stored in the first auxiliary field (one bit) BAx of the individual register GTx. In fact, the value stored in the main field CHx of the individual register GTx, the size of which in terms of bits is equal to the depth of the second memory (here two bits), represents the "symbolic" position of the last modifying instruction GMIx written into the memory 48. The first auxiliary field BAx, intended to receive the current value of the overflow bit of the write counter, makes it possible to take into account and to manage the respective eventual positions of the pointers in different circular counting windows.

In stage 124, it will now be determined whether the modifying instruction GMIx is still present in the memory 48, or whether it has actually left this memory. This is carried out by the second control unit MC1 and will now be described in more detail by referring more particularly to FIG. 6. Basically, the second control unit MC1 includes comparison means MC10 which will compare the content of the main field CHx of the individual register GTx with the current value RDVL of the read counter. This comparison will make it possible to determine whether the instruction GMIx is still present or has left the memory 48. That being so, in order to take into account the effects of the circular counting windows, provision is made for the second control unit MC1 also to include auxiliary comparison means, here formed from a first EXCLUSIVE NOR (XNOR) logic gate, referenced PL01. This logic gate is intended to derive a first logic signal SW1 from the content of the first auxiliary field BAx and from the value of the overflow bit RDOVFL of the read counter. In other words, this logic signal SW1 indicates whether the read pointer PL2 is in the same circular window as the position of the last instruction GMIx affecting the guard indication Gx.

The value of the first logic signal SW1 is then tested, in stage 420. If this logic signal is at 0, it is tested, in stage 422, whether the value of the word contained in the main field CHx is strictly higher than the current value RDVL of the read counter. If this is the case, then that means that the instruction GMIx has left the memory 48 (stage 423), and the bit BBx is then set to 0 (stage 126, FIG. 5).

The value of the first logic signal SW1 is then tested, in stage 420. If this logic signal is at 0, it is tested, in stage 422, whether the value of the word contained in the main field CHx is strictly higher than the current value RDVL of the read counter. If this is the case, then that means that the instruction GMIx has left the memory 48 (stage 423), and the bit BBx is then set to 0 (stage 126, FIG 5).

Referring again to FIG. 3, it is apparent that when the data unit 34 receives a sendguard microinstruction, the correct guard value should be selected and passed to the requesting execution unit as soon as possible to avoid unnecessary delays. A mechanism is described in the following which achieves this without unnecessary stalls in the data unit 34.

Figure 9:
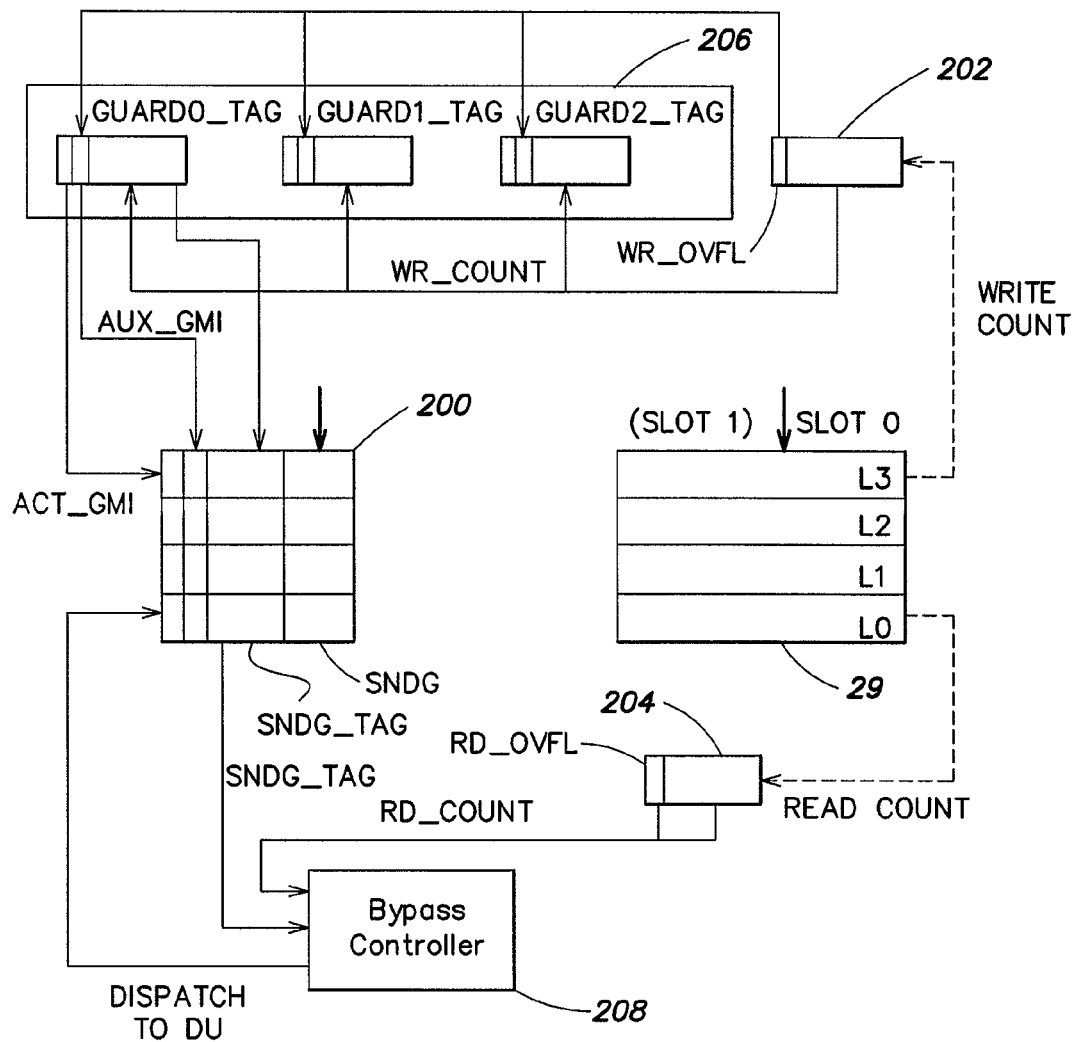
FIG. 9 shows an exemplary layout of the instruction queues.

The instruction data queue 29 of the data unit is implemented as a FIFO having a plurality of storage locations, each of which holds two microinstructions (slot 0 and slot 1). Referring to FIG. 9 which illustrates the main instruction FIFO 29 as having four storage locations L0 to L3, although in fact more than four would normally be provided. To implement the sendguard mechanism, a separate sendguard queue implemented as a FIFO 200 is provided for holding the sendguard (sndg) fields of any sendguard microinstructions written to the IDQ 29, each sndg field being associated with a sendguard tag sndg-tag. A write event counter 202 is incremented by 2 each time two new microinstructions are written to the main instruction FIFO 29. It includes an overflow bit wr_ovfl to take into account circular pointer effects. A read-event counter 204 counts the number of microinstructions read into the data unit pipelines 13,14. This may be two in each cycle or, where a horizontal slot dependency has been resolved, only one (i.e. a split sequence).

A gmi_tag register 206 holds a gmi_tag for each guard indicator. As already mentioned, there are fifteen guard indicators G0 to G14 with assigned guard values although only three such tags are shown in FIG. 9, labeled guard0_tag, guard1_tag etc. Each tag has six bits. Four bits represent a write count which is a value read from the write counter 202 (plus 0 for slot 0, plus 1 for slot 1) whenever a guard modifier instruction affecting that guard indicator is written to the FIFO 29. One bit is an aux_gmi-tag bit which is the overflow bit wr-ovfl from the write counter 202. The remaining bit is an active gmi bit act_gmi which indicates whether there is a valid guard modifier instruction (GMI) stored in the main instruction FIFO 29 affecting that guard indicator. This bit is set to one if a new GMI affecting that guard indicator is written to the main instruction FIFO 29 where there was not one before or if there remain any active GMIs affecting that guard indicator in the main instruction FIFO 29. Each time a sndg instruction is written to the sndg queue 200, the gmi_tag value for the guard indicator referred to in the sndg instruction is written to the sndg_tag associated with the sndg field is the sndg queue 200. Thus this indicates the symbolic slot position of the youngest GMI in the main instruction FIFO 29 modifying the requested guard indicator.

The purpose of the separate sndg queue is to provide a bypass feature into the data unit pipelines 13,14 so that as soon as a sndg instruction arrives it can be supplied to one of the pipelines 13,14 as soon as possible without unnecessary delays. However, it is important that it is not supplied to a pipeline in a cycle earlier than a GMI affecting that guard indicator which was expected to be executed earlier according to the instruction sequence in the original program. To make sure that this does not happen, a bypass controller 208 compares the read event count with the sndg tag at the head of the sndg queue 200 and the sndg instruction is supplied to the pipeline only if read-event counter >sndg-tag. Otherwise the next instruction in the FIFO 29 is fetched into the execution pipeline 13 or 14.

Figure 10:
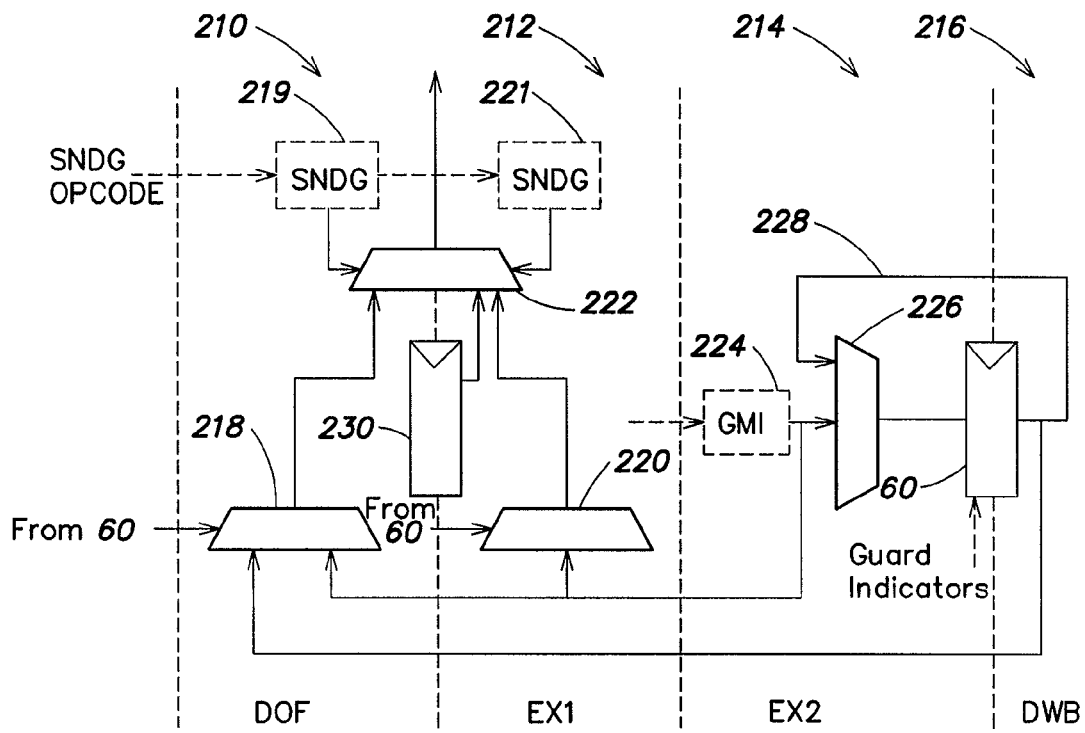
FIG. 10 is a diagram illustrating circuitry in the pipeline to avoid stalling when executing sendguard instructions.
Figure 11:
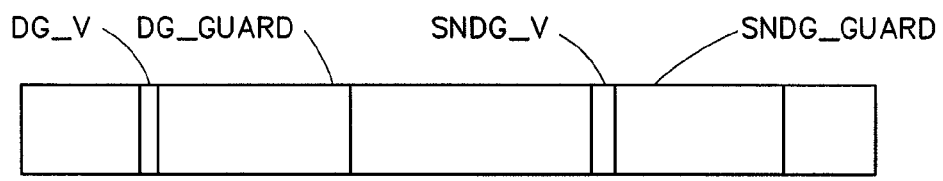
FIG. 11 is a partial diagram of a microinstruction format.

A mechanism will now be described with reference to FIG. 10 which avoids stalls of sendguard instructions which enter the data unit pipeline 13 or 14. In order to achieve this, it is necessary to know the dependency between a sendguard instruction dispatched into the data unit pipeline 13 or 14 and any guard modifier instructions affecting the value of the guard to be sent. Any such dependencies are resolved by the vertical dependency checker 62 for the data unit pipelines. Signals from the vertical dependency checker are dispatched into the data unit pipelines to control multiplexors described hereinafter to avoid stalling regardless of guard dependencies.

The vertical dependency checker 62 uses information provided in the fields of the microinstructions supplied to the data unit. FIG. 4 illustrates the relevant fields of a microinstruction, it will be appreciated that the microinstruction contains a number of other fields, but these are not included herein because they do not affect the dependency resolution. For guard modifier instructions, the relevant fields are dg-v which is equal to one when a guard is to be modified, and dg-guard which comprises four bits identifying which of the sixteen guard indicators is to be modified. The fields relevant to sendguard instructions are sndg-v which is equal to one when a guard is to be sent and sndg-guard which identifies which guard indicator value is to be sent.

As has briefly been explained above, each of the data unit pipelines comprises a data operand fetch stage 210, a first execution stage EX1 212, a second execution stage EX2 214 and a data writeback stage DW3 216. Instructions and data are propagated through the pipeline on successive machine cycles, such that each pipeline stage represents operations in each cycle. FIG. 10 does not illustrate the components of the pipeline which are necessary for the normal execution of instructions, nor does it show the interaction of the pipeline with the data register file 58. The required fields of the microinstructions are used at each appropriate stage in the pipeline and in particular the GMI and sendguard fields. The GMI fields dg-v and dg-guard are received in the DOF stage and are propagated through the subsequent first and second execution stages EX1 and EX2 as the instruction is executed. As a GMI instruction might itself be guarded, if it occurs that the guard indicator on which the GMI instruction is guarded is false, the field dg-v is unset and continues to propagate in the pipe with the unset value of zero. The dependencies between the sendguard instructions to be executed and any GMI instructions currently in the pipe can be resolved by using simple comparators with respect to the GMI fields and the sendguard fields. For example, for a sendguard instruction in the DOF stage of the pipeline, a comparison is made between its corresponding sendguard fields sndg-v and sndg-guard and the information available in subsequent stages of the pipeline EX1, EX2 relating to a possible GMI instruction ahead in the pipeline. For example, if a guard modifier instruction affecting the guard indicator GO is in the first execution stage EX1, and the sendguard instruction referring to GO is in the data operand fetch stage, a specific signal is set indicating that such a dependency exists. These signals are set by the vertical dependency checking unit 62 and are used to control multiplexors in the pipeline as described later.

Circuitry for executing sndg instructions is shown in dotted outline referenced 219 in DOF stage 210 and 221 in EX1 stage 212. These sendguard execution units 219, 221 receive sndg opcode from the sendguard instruction. Guard indicators for addressing the guard register file 27 are also supplied with the sendguard instruction. It will be appreciated that the pipeline includes other units, omitted for the sake of clarity. FIG. 10 is merely a diagrammatic representation of the pipeline stages, and additionally illustrates circuitry providing a mechanism for avoiding stalls of sendguard instructions. The circuitry comprises a first selection multiplexor 218 located in the data operand fetch stage 210, a second selection multiplexor 220 located in the first execution stage 212 and a guard selection multiplexor 222 which can propagate the correct guard value in either the data operand fetch stage or the first execution stage as described in the following. A computation unit 224 allows guard values to be computed responsive to guard modifier instructions in the second execution stage EX2 214. The output of the computation unit 224 is supplied to the guard register file 60 via a guard value output multiplexor 226. The guard register file 60 is addressable via the guard indicators in a manner not shown in FIG. 10 such that the computed guard value is written against the correct guard indicator. In each cycle, for each guard indicator either the existing value is written back into the guard register file via the feedback loop 228, or the newly modified guard value is written to the guard register file for the particular guard indicator. The mechanism operates as follows.

When there is no guard dependency, that is when there are no earlier instructions in the pipeline which imply the modification of the guard value which has been requested to be sent by the sendguard instruction which has just entered the pipeline, the first selection multiplexor 218 is controlled to supply the architectural guard value from the guard register file 60 and the guard selection multiplexor 222 outputs this guard value in the data operand fetch stage of the pipeline. Thus, only a single cycle is required to deal with the sendguard instruction and to dispatch the correct guard value.

When there is an earlier instruction in the pipeline located two cycles ahead which modifies the guard value requested to be sent by the sendguard instruction, this guard value is computed in the second execution stage of the pipeline as the sendguard instruction is received in the data operand fetch stage. The just computed guard value is supplied to the first selection multiplexor 218 and is selected through to the guard selection multiplexor 222. Thus, this also allows the correct guard value to be dispatched in the first cycle of execution of the sendguard instruction.

The mechanism is slightly more complicated in the case where a guard modifying instruction is located one cycle ahead of the sendguard instruction and is modifying the requested guard value. In this case, the sendguard instruction is not dealt with in the data operand fetch stage, but is propagated though to the first execution stage EX1. In the same machine cycle, the guard modifying instruction ahead of it is computed by the computation unit 224 in the second execution stage EX2 and the just computed value is returned to the second selection multiplexor 220. In this case therefore, the guard selection multiplexor 222 dispatches the output of the second selection multiplexor 220 rather than the output of the first selection multiplexor 218 thereby allowing the sendguard instruction to be dealt with in two cycles. Although this is slower than a single cycle achieved in the first two cases, the performance is still high because no stalls in the pipeline have occurred.

By including a guard value store 230 at the output of the data operand fetch stage, it is also possible to deal with two sendguard instructions entering the pipeline one after the other immediately following a guard modifier instruction. The first sendguard instruction which has the guard modifier instruction just in front of it by one cycle is dealt with as just described. That is, it is propagated through to the first execution stage EX1 so that the guard value can be computed in the computation unit 224 in the second execution stage EX2. The just computed guard value is then dispatched as already described. While this is happening it is however possible to deal with the second sendguard instruction in the data operand fetch stage. If the sendguard instruction relates to a guard value not affected by the guard modifier instruction, it can be dealt with in the normal way and the value selected from the architectural guard register 60 held in the store 230 ready for dispatch on the subsequent cycle after the just computed guard value has been dispatched. if the second sendguard instruction relates to the same guard indicator which has been modified by the earlier guard modifier instruction, the value which is held in the store 230 is the just computed value which is returned back to the first selection multiplexor 218 in the data operand fetch stage. This allows maximum use of the pipeline stages and avoids stalls of the sendguard instructions whatever are the dependencies.

Figure 7:
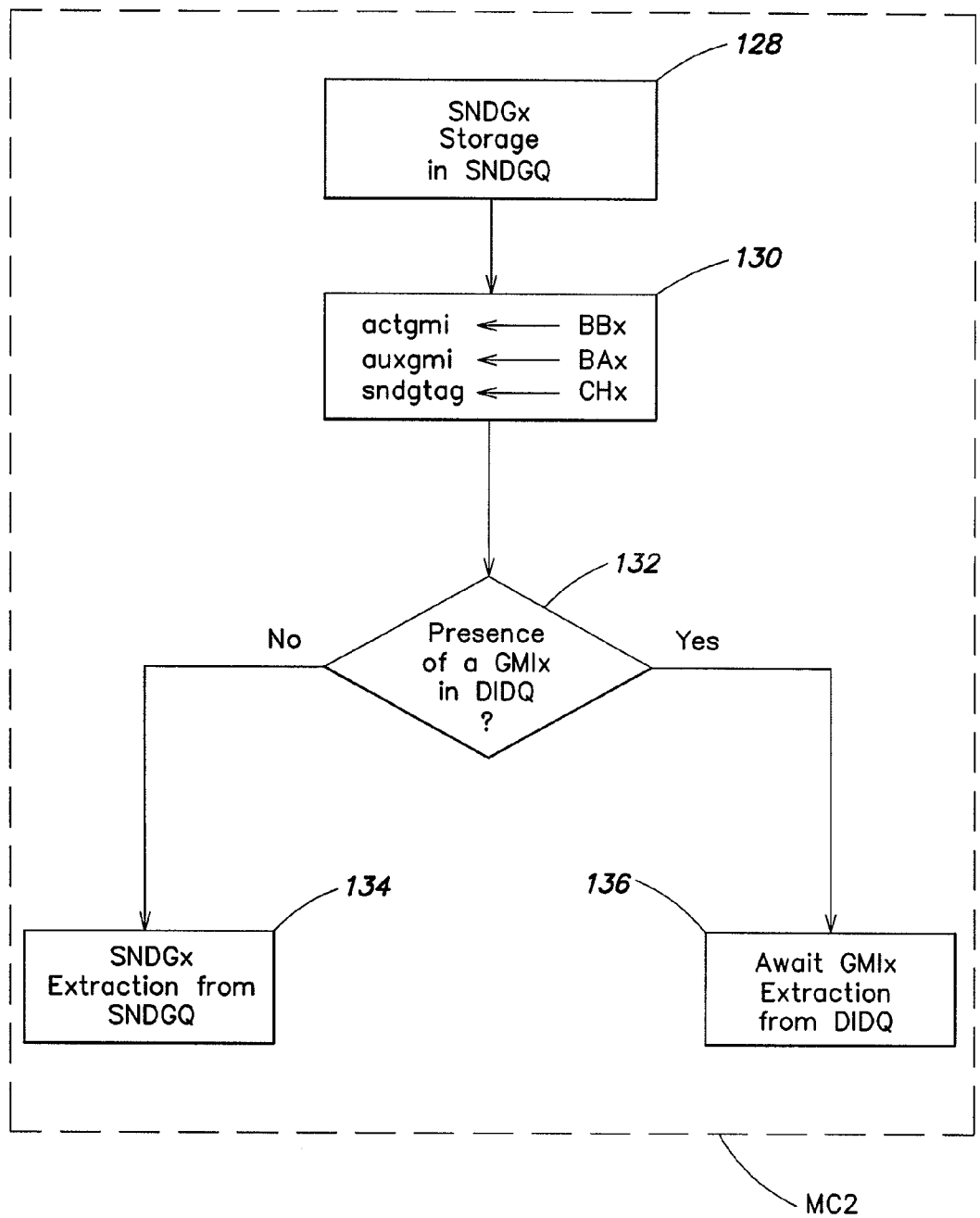
FIG. 7 is a flow-chart illustrating in more detail one component of the method of FIG. 4.

A more detailed description will now be given, referring more particularly to FIGS. 7 and 8, of the processing operations carried out when a transmission instruction SNDGx is stored in the usable field CHU1 of the input stage ETG1 of the memory 46, as well as the deriving of its extraction criterion, when this transmission instruction SNDGx has reached the head of the memory 46, that is to say when it is present in the usable field CHU4 of the output stage ETG4.

In order not to disturb the correct time-based synchronization of the processing operations, every time a transmission instruction SNDGx is stored in the memory 46 (SNDGQ) and when another instruction is not stored in the memory 48, a non-operative instruction NOP is also stored in the memory 48. As is known to the person skilled in the art, a NOP instruction does not modify the content of the architectural registers of the processor core. Furthermore, every time a transmission instruction SNDGx is stored in the memory 46, for example in the usable field CHU1 of the stage ETG1, a label is associated with it which corresponds to the content of the corresponding individual register GTx.

This label will be continually attached to the transmission instruction SNDGx in the memory 46. In practice, the label associated with a transmission instruction SNDGx is formed in each stage of the memory 46 by a first supplementary field Sndgtag, a second supplementary field (1 bit) Auxgmi, and a third supplementary field (likewise 1 bit) Actgmi. When a transmission instruction SNDGx is stored in the header stage of the memory 46 (stage 128, FIG. 7), the third control unit MC2 transfers (stage 130, FIG. 7) the content of the main field CHx into the first supplementary field Sndgtag, the content of the first auxiliary field BAx into the second supplementary field Auxgmi, and, the content of the second auxiliary field BBx into the third supplementary field Actgmi. The content of this label will remain unchanged during the propagation of the instruction SNDGx to which it is attached, until this instruction reaches the head of the memory 46.

At that instant, the fourth control unit MC3 will test (stage 132) for the presence or the absence of a modifying instruction GMIx which is earlier in time in the memory 48. If a modifying instruction GMIx is present, then the third control unit MC2 will wait, for extracting the transmission instruction from the memory 46, for the modifying instruction GMIx to be extracted from the memory 48 (stage 136). If, in contrast, no instruction GMIx is detected in the memory 48, the third control unit MC2 will immediately extract the transmission instruction SNDGx from the head of the memory 46 (stage 134).

It is the fourth control unit MC3 which will derive the criterion for extraction of this transmission instruction SNDGx having reached the head of the first memory. In order to determine whether a modifying instruction GMIx is present in the memory 48, the unit MC3 will first of all test the value of the bit Actgmi of the label attached to the transmission instruction SNDGx (stage 620, FIG. 8).

If this bit Actgmi is equal to 0, then that means that no instruction GMIx which is earlier in time than the instruction SNDGx is present in the memory 48 (stage 621). In this case, the transmission instruction SNDGx can be extracted immediately from the memory 46 (stage 134, FIG. 7). If, in contrast, the bit Actgmi is at 1, then it is basically appropriate to compare the content of the first supplementary field Sndgtag with the current value RDVL of the read counter. This is the role of the comparison means MC30. Basically, an absence of instruction GMIx will be conveyed by a value RDVL which is strictly higher than the first supplementary field Sndgtag. That being so, here again, it is appropriate to take into account the effects of the circular counting windows.

It is for this reason that provision is made for the control unit MC3 to include supplementary comparison means, here formed from a second EXCLUSIVE NOR logic gate, referenced PLO3 and able to compare the bit Auxgmi with the overflow bit RDOVFL of the read counter. The result of this comparison supplies a second logic signal SW3. This signal SW3 indicates whether the read pointer PL2 of the second memory 48 is in the same circular window as the position of the last modifying instruction GMIx, potentially having an effect on the transmission instruction SNDGx.

Figure 8:
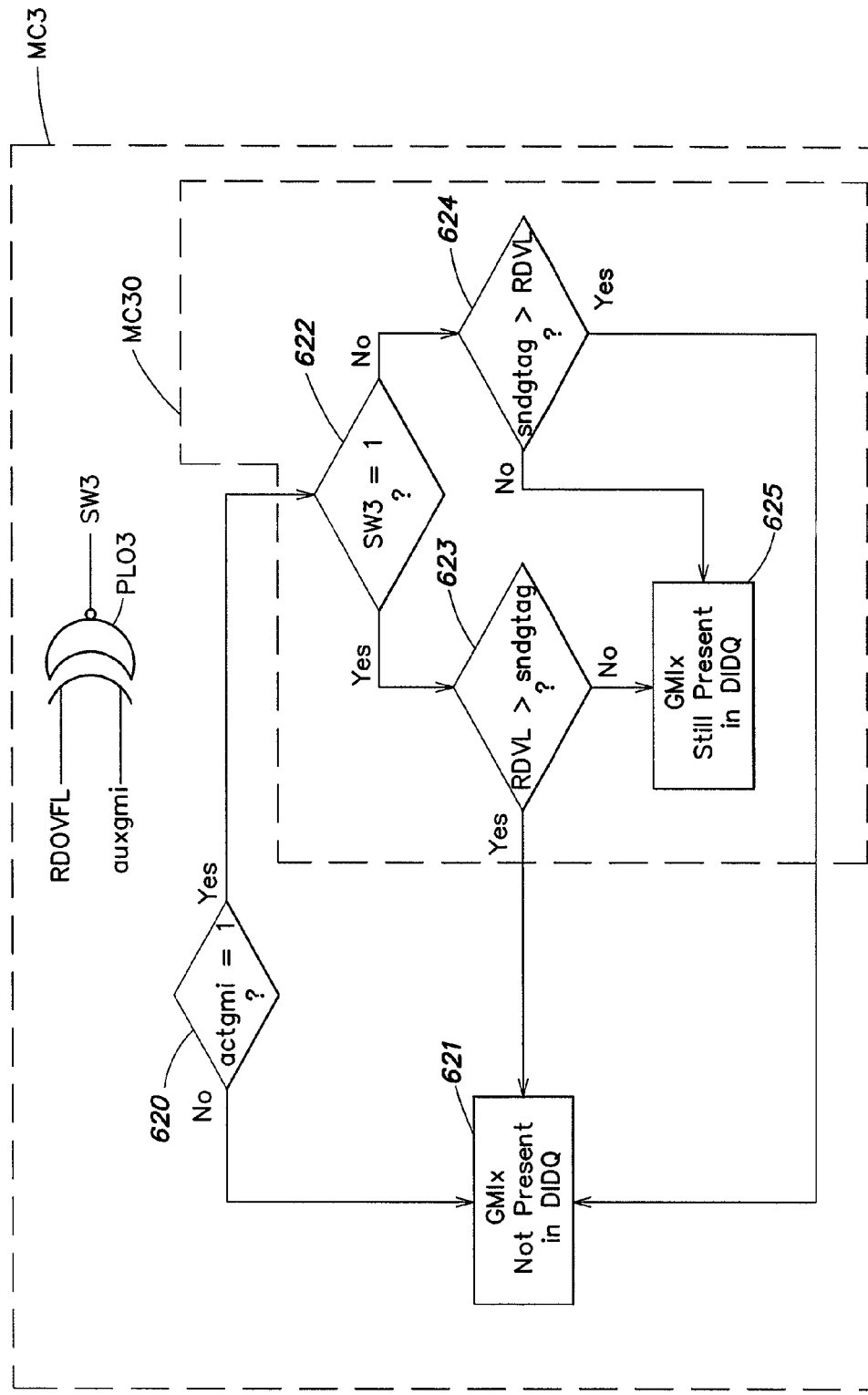
FIG. 8 is a flow-chart illustrating in more detail one component of the method of FIG. 4.

If the signal SW3 is at 1, then the transmission instruction SNDGx will be able to be transmitted if the value RDVL is higher than Sndgtag (stage 623, FIG. 8).

In the opposite case, that means that an instruction GMIx is still present in the second memory 48 (stage 625). And it is appropriate to wait before extracting the transmission instruction SNDGx from the head of the memory 46. If the signal SW3 is at 0, then it is possible to extract the transmission instruction SNDGx if the value of the word Sndgtag is strictly higher than the value of the read counter RDVL (stage 624). In the opposite case, it is appropriate to wait (stage 625).

In hardware terms, the various control units MC0-MC3 can be produced in the form of an integrated circuit by using logic-synthesis tools. The embodiment which has just been described makes it possible to implement the method according to the invention very simply. It should also be noted that the depth of the first memory 46 may be different from that of the memory 48. Furthermore, everything which has just been described for a guard indication Gx is in reality carried out in parallel simultaneously for all the guard indications.

Having thus described various illustrative embodiments and aspects thereof, modifications and alterations may be apparent to those of skill in the art. Such modifications and alterations are intended to be included in this disclosure, which is for the purpose of illustration and explanation and is not intended to be limiting. The scope of the invention should be determined from proper construction of the appended claims, and their equivalents.

What is claimed is:

1. A computer system for executing instructions having assigned guard indicators, the system comprising:
  instruction supply circuitry, wherein the instruction supply circuitry comprises a main instruction queue for holding instructions to be supplied to a plurality of parallel execution units and a subsidiary instruction queue for holding sendguard instructions, the subsidiary instruction queue having priority access to execution pipelines to avoid unnecessary delays for execution of sendguard instructions;

the plurality of parallel execution units for receiving respective instructions from the instruction supply circuitry, wherein:
- each of the instructions has a respective guard indicator selected from a set of guard indicators common to the plurality of execution units;
- at least one of the plurality of execution units includes a master guard value store containing a master representation of current values for the guard indicators in the set of guard indicators; and
- a first execution unit from the plurality of execution units contains a guard-indications register; and guard value transfer circuitry operable to:
transfer a guard value from the master store to another of the execution units in response to a sendguard instruction being executed in the at least one execution unit; and
when a guarded instruction is issued to memory means of a second execution unit from the plurality of execution units, which causes issuing a sendguard instruction to memory means of the first execution unit to have a value of a guard indication associated with the guarded instruction transmitted to the second execution unit, transfer the value of the guard indication to the second execution unit; wherein:
the memory means of the first execution unit includes a first FIFO-type memory, and a second FIFO-type memory separate from the first FIFO-type memory;
each sendguard instruction is stored in the first FIFO-type memory and all other instructions intended for the first execution unit are stored in the second FIFO-type memory;
a sendguard instruction having reached a head of the first FIFO-type memory is extracted from the first FIFO-type memory, if no modifying instruction which is earlier in time and intended to modify the value of the guard indication associated with the sendguard instruction is present in the second FIFO-type memory; and
in the presence of such an earlier, modifying instruction, the sendguard instruction is extracted from the first FIFO-type memory only after the modifying instruction has been extracted from the second FIFO-type memory.

2. The computer system of claim 1, wherein each parallel execution unit includes circuitry for executing guard value modifying instructions which are held in the main instruction queue and for updating said master guard value store with any modified guard value.

3. The computer system of claim 2, wherein the instruction supply circuitry comprises a control unit common to each parallel execution unit, said control unit including queue checking circuitry which is operable to check, before each sendguard instruction is supplied to the execution pipelines, that no earlier guard value modifying instructions affecting a guard value requested by the sendguard instruction is still waiting in the main instruction queue.

4. The computer system of claim 2, wherein each execution unit comprises a plurality of pipelined stages with synchronized pipelined cycles for each of the execution units and the circuitry for executing guard value modifying instructions is located in a pipelined stage downstream of an earlier pipelined stage operable to execute sendguard instructions.

5. The computer system of claim 4, further comprising switching circuitry in an earlier pipelined stage for supplying a guard value which has been modified by a guard value modifying instruction in a subsequent pipelined stage in a machine cycle responsive to a sendguard instruction in the earlier pipelined stage in a same machine cycle.

6. The computer system of claim 1, wherein each execution unit comprises a plurality of pipelined stages with synchronized pipelined cycles for each of the execution units.

7. The computer system of claim 1, wherein each execution unit comprises first, second and third pipelined stages wherein the first and second pipelined stages contain circuitry for executing sendguard instructions, and the third pipelined stage includes circuitry for executing guard value modifying instructions.

8. The computer system of claim 7, further comprising switching circuitry for selecting, responsive to a sendguard instruction, whether a guard value held in the master guard value store or a guard value just modified by a guard value modifying instruction is dispatched via the guard value transfer circuitry.

9. The computer system of claim 1, wherein each parallel execution unit includes execution pipelines providing access to a data memory, said pipelines including a first set of pipelines for use in executing instructions needed for memory access operations and a second set of pipelines arranged to carry out arithmetic operations, thereby providing decoupling of memory access operations from arithmetic operations.

10. The computer system of claim 9, wherein two parallel pipelines are provided for arithmetic operations and access a common set of data registers including said master guard value store.

11. The computer system of claim 1, wherein said master guard value store comprises a register file.

12. A method of executing instructions in a computer system, said instructions having assigned guard indicators, the method comprising:
supplying a plurality of instructions to a plurality of parallel execution units each including a first execution unit and a second execution unit, each instruction having a respective guard indicator selected from a set of guard indicators common to the plurality of parallel execution units;
holding a master set of current values for the guard indicators in one execution unit;
effecting a transfer of a master guard value from said one execution unit in response to a sendguard instruction being executed in said one execution unit;
wherein instructions to be supplied to the plurality of parallel execution units, except for sendguard instructions, are held in a main instruction queue and wherein said sendguard instructions are held in a subsidiary queue having priority access to execution pipelines to avoid unnecessary delays for execution of sendguard instructions; and
when a guarded instruction is issued to memory means of the second execution unit, which causes issuing a sendguard instruction to memory means of the first execution unit to have a value of a guard indication associated with the guarded instruction transmitted to the second execution unit, transferring the value of the guard indication to the second execution unit; wherein:
the memory means of the first execution unit includes a first FIFO-type memory, and a second FIFO-type memory separate from the first FIFO-type memory;
each sendguard instruction is stored in the first FIFO-type memory and all other instructions intended for the first execution unit are stored in the second FIFO-type memory;
a sendguard instruction having reached a head of the first FIFO-type memory is extracted from the first FIFO-type memory, if no modifying instruction which is earlier in time and intended to modify the value of the guard indication associated with the sendguard instruction is present in the second FIFO-type memory; and in the presence of such an earlier, modifying instruction, the sendguard instruction is extracted from the first FIFO-type memory only after the modifying instruction has been extracted from the second FIFO-type memory.

13. The method of claim 12, including executing instructions to modify said guard values wherein execution of an instruction to modify a guard value updates said master value, said guard value modifying instructions being held in the main instruction queue.

14. The method of claim 13, further comprising a step of checking, before each sendguard instruction is supplied to the execution pipelines, that no earlier guard value modifying instruction affecting the guard value requested by the sendguard instruction is still waiting in the main instruction queue.

15. A pipelined execution unit for a computer system which comprises at least two pipelined stages, with an earlier one of the pipelined stages including sendguard circuitry responsive to a sendguard instruction to dispatch a guard value for a guard indicator defined in the sendguard instruction, and a later one of the pipelined stages including guard value modifying circuitry for executing guard value modifying instructions which cause the value of a guard indicator to be modified, the pipelined execution unit further comprising:

a master guard value store for holding a master representation of current values for guard indicators;

means for determining any dependencies between a sendguard instruction in the earlier pipelined stage and a guard modifying instruction in the later pipelined stage;

switching circuitry for selecting when a sendguard instruction is executed and, responsive to any such dependencies, whether a guard value held in the master guard value store or a guard value just modified by the guard value modifying circuitry is to be dispatched; and a plurality of execution units comprising a first execution unit containing a guard-indications register, wherein when a guarded instruction is issued to memory means of a second execution unit from the plurality of execution units, which causes issuing a sendguard instruction to memory means of the first execution unit to have a value of a guard indication associated with the guarded instruction transmitted to the second execution unit, wherein:

the memory means of the first execution unit includes a first FIFO-type memory, and a second FIFO-type memory separate from the first FIFO-type memory;

each sendguard instruction is stored in the first FIFO-type memory and all other instructions intended for the first execution unit are stored in the second FIFO-type memory;

a sendguard instruction having reached a head of the first FIFO-type memory is extracted from the first FIFO-type memory, if no modifying instruction which is earlier in time and intended to modify the value of the guard indication associated with the sendguard instruction is present in the second FIFO-type memory; and in the presence of such an earlier, modifying instruction, the sendguard instruction is extracted from the first FIFO-type memory only after the modifying instruction has been extracted from the second FIFO-type memory.

16. The pipelined execution unit of to claim 15, which comprises first, second and third pipelined stages wherein the first and second pipelined stages each contain such circuitry for executing sendguard instructions, and the third pipelined stage includes such circuitry for executing guard value modifying instructions.

17. The pipelined execution unit of claim 15, further including a data write-back stage for writing back the results of execution of an instruction into a data store.

18. A method of executing instructions in a pipelined execution unit comprising a plurality of execution units each including a first execution unit and a second-execution unit, each instruction having a respective guard indicator selected from a set of guard indicators and execution of the instructions being predicated on values of the guard indicators, wherein the instructions include a sendguard instruction which, when executed, causes transfer of a guard value from the pipelined execution unit, and a guard value modifying instruction which modifies the value of a guard indicator, the method comprising:

supplying instructions to the pipelined execution unit including said sendguard instructions and said guard value modifying instructions;

checking dependencies between guard value modifying instructions supplied to the pipelined execution unit earlier than a sendguard instruction relating to a same guard indicator;

supplying the guard value of the guard indicator requested in the sendguard instruction selectively from a master guard value store or guard value modifying circuitry in dependence on results of said checking step, so as to ensure that the guard value of a guard indicator which is dispatched responsive to a sendguard instruction is correct in relation to any earlier guard value modifying instructions in the pipelined execution unit; and when a guarded instruction is issued to memory means of the second execution unit, which causes issuing a sendguard instruction to memory means of the first execution unit to have a value of a guard indication associated with the guarded instruction transmitted to the second execution unit, transferring the value of the guard indication to the second execution unit; wherein:

the memory means of the first execution unit includes a first FIFO-type memory, and a second FIFO-type memory separate from the first FIFO-type memory;

each sendguard instruction is stored in the first FIFO-type memory and all other instructions intended for the first execution unit are stored in the second FIFO-type memory;

a sendguard instruction having reached a head of the first FIFO-type memory is extracted from the first FIFO-type memory, if no modifying instruction which is earlier in time and intended to modify the value of the guard indication associated with the sendguard instruction is present in the second FIFO-type memory; and in the presence of such an earlier, modifying instruction, the sendguard instruction is extracted from the first FIFO-type memory only after the modifying instruction has been extracted from the second FIFO-type memory.

19. A method of handling guarded instructions within a processor, the processor including several processing units associated respectively with FIFO-type memory means for sequentially storing respective guarded instructions which are intended for corresponding processing units, a first processing unit containing a guard-indications register, the method comprising issuing a guarded instruction to the memory means of a second processing unit which causes issuing to the memory means of the first processing unit a transmission instruction intended to have a value of a guard indication associated with said guarded instruction transmitted to the second processing unit, wherein:

the memory means of the first processing unit includes a first FIFO-type memory, and a second FIFO-type memory separate from the first FIFO-type memory;

each transmission instruction is stored in the first FIFO-type memory and all other instructions intended for the first processing unit are stored in the second FIFO-type memory;

a transmission instruction having reached a head of the first FIFO-type memory is extracted from the first FIFO-type memory, if no modifying instruction which is earlier in time and intended to modify the value of the guard indication associated with the transmission instruction is present in the second FIFO-type memory; and in the presence of such an earlier, modifying instruction, the transmission instruction is extracted from the first FIFO-type memory only after the modifying instruction has been extracted from the second FIFO-type memory.

20. The method of claim 19, wherein:

every time an instruction is extracted from the second FIFO-type memory, a read counter is incremented;

every time an instruction is stored in the second FIFO-type memory, a write counter is incremented;

every time an instruction modifying the value of a guard indication is stored in the second FIFO-type memory, a current value of the write counter is stored in memory; and determining of a still-present character of the modifying instruction in the second FIFO-type memory takes account of a result of a comparison of the current value of the write counter with the current value of the read counter.

21. The method of claim 20, wherein:

the write counter and the read counter have an identical size which is equal to a depth of the second FIFO-type memory;

an overflow bit changing value every time a corresponding counter comes back to its initial value is associated with each counter;

every time an instruction modifying the value of a guard indication is stored in the second FIFO-type memory, the current value of the overflow bit of the write counter is likewise stored in memory; and the determining of the still-present character of the modifying instruction in the second FIFO-type memory also takes into account the result of the comparison of the current value of the overflow bit of the read counter with a memory-stored value of the overflow bit of the write counter.

22. The method of claim 20, wherein:

every time a transmission instruction is stored in the first FIFO-type memory, without another instruction simultaneously being stored in the second FIFO-type memory, a non-operative instruction is simultaneously stored in the second FIFO-type memory;

every time a transmission instruction is stored a label is associated with said transmission instruction, containing the current value of the write counter which was stored in memory when a last instruction modifying the guard indication associated with said transmission instruction was stored in the second FIFO-type memory; and a criterion for extraction of the transmission instruction having reached the head of the first FIFO-type memory takes into account the result of the comparison between said memory-stored current value associated with this transmission instruction and the current value of the read counter.

23. The method of claim 21, wherein:

every time a transmission instruction is stored in the first FIFO-type memory, the current value of the overflow bit of the write counter which was stored in memory when the last instruction modifying the guard indication associated with said transmission instruction was stored in the second FIFO-type memory is associated with it, in its label; and a criterion for extraction of the transmission instruction having reached the head of the first FIFO-type memory takes into account the result of the comparison between this memory-stored current value associated with this transmission instruction and the current value of the overflow bit of the read counter.

* * * * *